United States Patent
Kosche

(10) Patent No.: US 6,564,297 B1
(45) Date of Patent: May 13, 2003

(54) COMPILER-BASED CACHE LINE OPTIMIZATION

(75) Inventor: Nicolai Kosche, San Francisco, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 414 days.

(21) Appl. No.: 09/594,430

(22) Filed: Jun. 15, 2000

(51) Int. Cl.⁷ .............................................. G06F 12/02
(52) U.S. Cl. ........................................................ 711/118
(58) Field of Search .............................. 711/118, 167; 717/151, 152, 154, 159

(56) References Cited

U.S. PATENT DOCUMENTS

| | | |
|---|---|---|
| 5,900,022 A | 5/1999 | Kranich |
| 5,950,007 A | 9/1999 | Nishiyama et al. |
| 6,049,669 A | 4/2000 | Holler |

FOREIGN PATENT DOCUMENTS

| | | |
|---|---|---|
| EP | 0 743 598 A2 | 11/1996 |
| EP | 0 919 921 A2 | 6/1999 |

OTHER PUBLICATIONS

Kandemin et al., "Improving cache Locality by a Combination of Loop and Data Transformations", 1999, IEEE, p159–167.*

Trancoso et al., "Cache Optimization for Memory–Resident Decision Support Commercial Workloads", 1999, IEEE, p546–554.*

Carr et al., "Compiler Optimizations for Improving Data Locality", 1994, ACM, p252–262.*

(List continued on next page.)

*Primary Examiner*—Kevin L. Ellis
(74) *Attorney, Agent, or Firm*—Rosenthal & Osha L.L.P.

(57) ABSTRACT

Cache line optimization involves computing where cache misses are in a control flow and assigning probabilities to cache misses. Cache lines may be scheduled based on the assigned probabilities and where the cache misses are in the control flow. Cache line probabilities may be calculated based on the relationship of the cache line and where the cache misses are in the control flow. A control flow may be pruned before calculating cache line probabilities. Function call sites may be used to prune the control flow. Address generation of a cache miss may be duplicated to speculatively hoist address generation and the associated prefetch. References may be selected for optimization, identifying cache lines, and mapping the selected references. Dependencies within the cache lines may be determined and the cache lines may be scheduled based on the determined dependencies and probabilities of usefulness. Instructions may be scheduled based on the scheduled cache lines and the target machine model to maximize outstanding memory transactions. Cache lines may be scheduled across call sites.

19 Claims, 21 Drawing Sheets

OTHER PUBLICATIONS

McKinley et al., "Improving Data Locality with Loop Transformations", 1996, ACM, p424–453.*

IBM, "Executable Program Restructuring for Optimal Cache/Real Memory Utilization", IBM TDB, vol. 36, issue 12, p153–154, 1993.*

IBM, "Code Optimization by Hints to the Compiler", IBM TDB, vol. 40, issue 9, p125–128, 1997.*

Gupta et al, "Improving Instruction Cache Behvior by Reducing Cache Pollution", 1990, IEEE, p82–91.*

Hwu et al., "Achieving High Instruction Cache Performance with an Optimizing Compiler", 1989 ACM, p242–251.*

IBM, "Selective Prefetching Based on Miss Latencye" IBM TDB, vol. 36, issue 10, p411–412, 1993.*

IBM, "Grouping of Instructions", IBM TDB, vol. 38, issue 8, p531–534, 1995.*

Holler, A.M.; "Optimization for a Superscalar Out–of–Order Machine," Proceedings of the 29th Annual IEEE/ACM Int'l. Symposium on Microarchitecture, Micro–29, Paris, Dec. 2–4, 1996; Proceedings of the Annual IEEE/ACM Int'l. Symposium on Microarchitecture (Micro), Los Alamitos, IEEE Comp. Soc. Press, U, vol. SYMP. 29, Dec. 2 1996, pp. 336–348.

Wolf, M.E. et al.; "Combining Loop Transformations Considering Caches and Scheduling," Proceedings of the 29th Annual IEEE/ACM Int'l. Symposium on Microarchitecture, Micro–29, Paris, Dec. 2–4, 1996; Proceedings of the Annual IEEE/ACM Int'l. Symposium on Microarchitecture (Micro), Los Alamitos, IEEE Comp. Soc. Press, U, vol. SYMP. 29, Dec. 2 1996, pp. 274–286.

PCT International Search Report, Sep. 30, 2002, 4 pgs.

* cited by examiner

COMPILER-BASED CACHE LINE OPTIMIZATION

BACKGROUND OF THE INVENTION

Generally, a microprocessor operates much faster than main memory can supply data to the microprocessor. Therefore, many computer systems temporarily store recently and frequently used data in smaller, but much faster cache memory. Cache memory may reside directly on the microprocessor chip (Level 1 cache) or may be external to the microprocessor (Level 2 cache). In the past, on-chip cache memory was relatively small, 8 or 16 kilobytes (KB); however, more recent microprocessor designs have on-chip cache memories of 256 and even 512 KB.

Referring to FIG. 1, a typical computer system includes a microprocessor (10) having, among other things, a CPU (12), a load/store unit (14), and an on-board cache memory (16). The microprocessor (10) is connected external cache memory (17) and a main memory (18) that both hold data and program instructions to be executed by the microprocessor (10). Internally, the execution of program instructions is carried out by the CPU (12). Data needed by the CPU (12) to carry out an instruction are fetched by the load/store unit (14) and loaded into internal registers (15) of the CPU (12). A memory queue (not shown) maintains a list of outstanding memory requests. The load/store unit adds requests into the memory queue and also loads registers with values from the memory queue. When the memory queue contains a list of outstanding memory requests this is referred to as a memory transaction. The memory transaction is released, or guaranteed to be completed, with other instructions. The correspondence between starting and releasing memory transactions with instructions helps a compiler manage the memory queue.

Upon command from the CPU (12), the load/store unit (14) searches for the data first in the fast on-board cache memory (16), then in external cache memory (17), and finally in the slow main memory (18). Finding the data in the cache memory is referred to as a "hit." Not finding the data in the cache memory is referred to as a "miss."

The time between when a CPU requests data and when the data is retrieved and available for use by the CPU is termed the "latency" of the system. If requested data is found in cache memory, i.e., a data hit occurs, the requested data can be accessed at the speed of the cache and the latency of the system is reduced. If, on the other hand, the data is not found in cache, i.e., a data miss occurs, and thus the data must be retrieved from main memory for access, the latency of the system is increased.

In pursuit of increasing efficiency by reducing latency and increasing the hit to miss ratio associated with cache memory, prefetch operations have been implemented in many computer systems. Prefetch operations retrieve data associated with a memory operation prior to when the memory operation occurs. By doing so, when the memory operations occurs, the data is present in the cache memory. It is important to schedule prefetch operations at optimal points in an instruction line and to prefetch only data that is likely to be referenced.

SUMMARY OF THE INVENTION

In general, in accordance with an embodiment of the present invention, a method for cache line optimization of programs with irregular access patterns comprises selecting references for optimization, identifying cache lines, and mapping the selected references, determining dependencies within the cache lines, and scheduling the cache lines based on the determined dependencies with the goal of increasing the number of outstanding cache line misses at all times.

In general, in accordance with an embodiment of the present invention, a method of cache line optimization comprises a cache line scheduling step, and an instruction line scheduling step based on the cache line scheduling step.

In general, in accordance with an embodiment of the present invention, a software tool for cache line optimization comprises a program stored on computer-readable media for selecting references for optimization, identifying cache lines, mapping the selected references to the identified cache lines, determining dependencies within the cache lines, and scheduling the cache lines based on the determined dependencies.

In general, in accordance with an embodiment of the present invention, a software tool for cache line optimization comprises a program stored on computer-readable media for scheduling a cache line, and scheduling an instruction line based on the cache line scheduling.

In general, in accordance with an embodiment of the present invention, an apparatus for cache line optimization comprises cache line scheduling means, and instruction line scheduling means, wherein the instruction line scheduling means schedules instructions based on the cache line scheduling means.

Other advantages and features will become apparent from the following description, including the figures and the claims.

DETAILED DESCRIPTION

Figure 1:
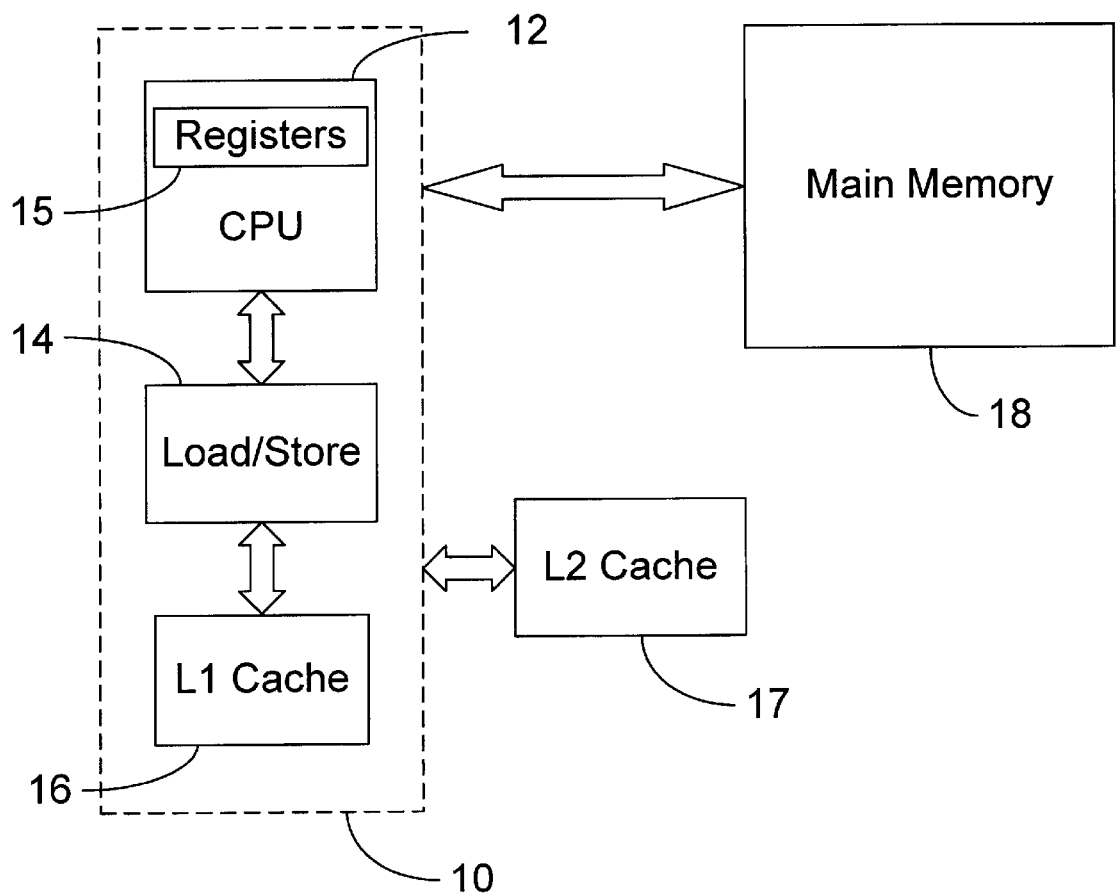
FIG. 1 shows a typical computer system.
Figure 2:
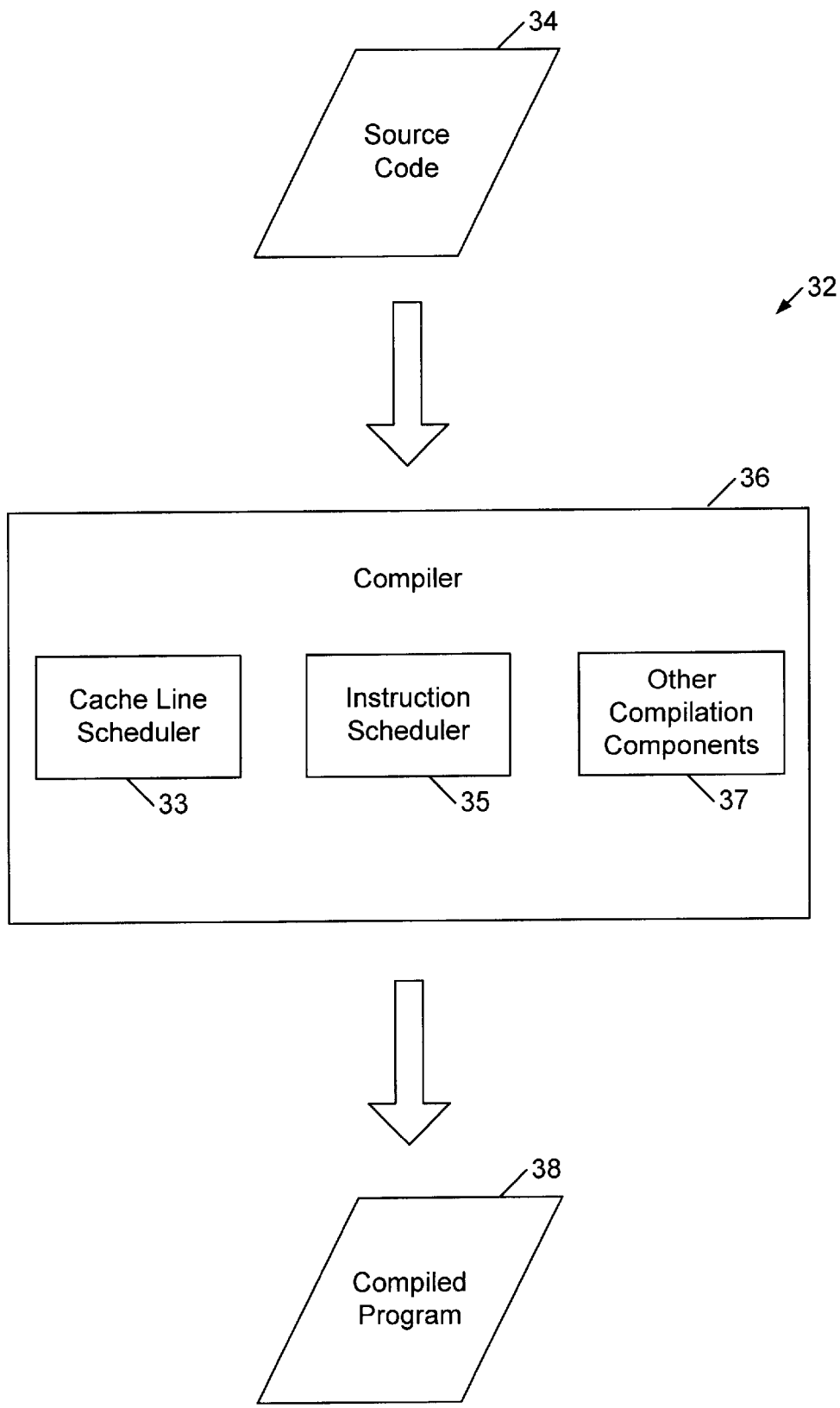
FIG. 2 is a block diagram of a compilation process in accordance with an embodiment of the present invention.

The present invention relates to a software tool for performing compiler-based cache line optimization on programs with irregular memory access patterns. Referring to the drawings wherein like reference characters are used for like parts throughout the several views, FIG. 2 shows a block diagram of a compilation process (32).

The compilation process (32) involves translating source code (34) with a compiler (36) to produce compiled program (38) suitable for execution on CPU 12. The compiler (36) includes a the cache line scheduler (33) of the present invention, as well as an instruction scheduler (35), and other compilation components (37) for carrying out other compilation tasks. During compilation, the source code (34) is converted into intermediary stages by the components of the compiler (36). Specifically, the cache line scheduler (33) first optimizes the source code (34) by reducing duplicate fetches and minimizing the cache miss critical path. The operation of the cache line scheduler is discussed in detail more below. Once an independent portion of the source code (34) has been optimized by the cache line scheduler (33), the instruction scheduler (35) compiles an instruction set. The operation of the instruction scheduler and other compiler components are well known in the art and will not be discussed in detail here.

Figure 3:
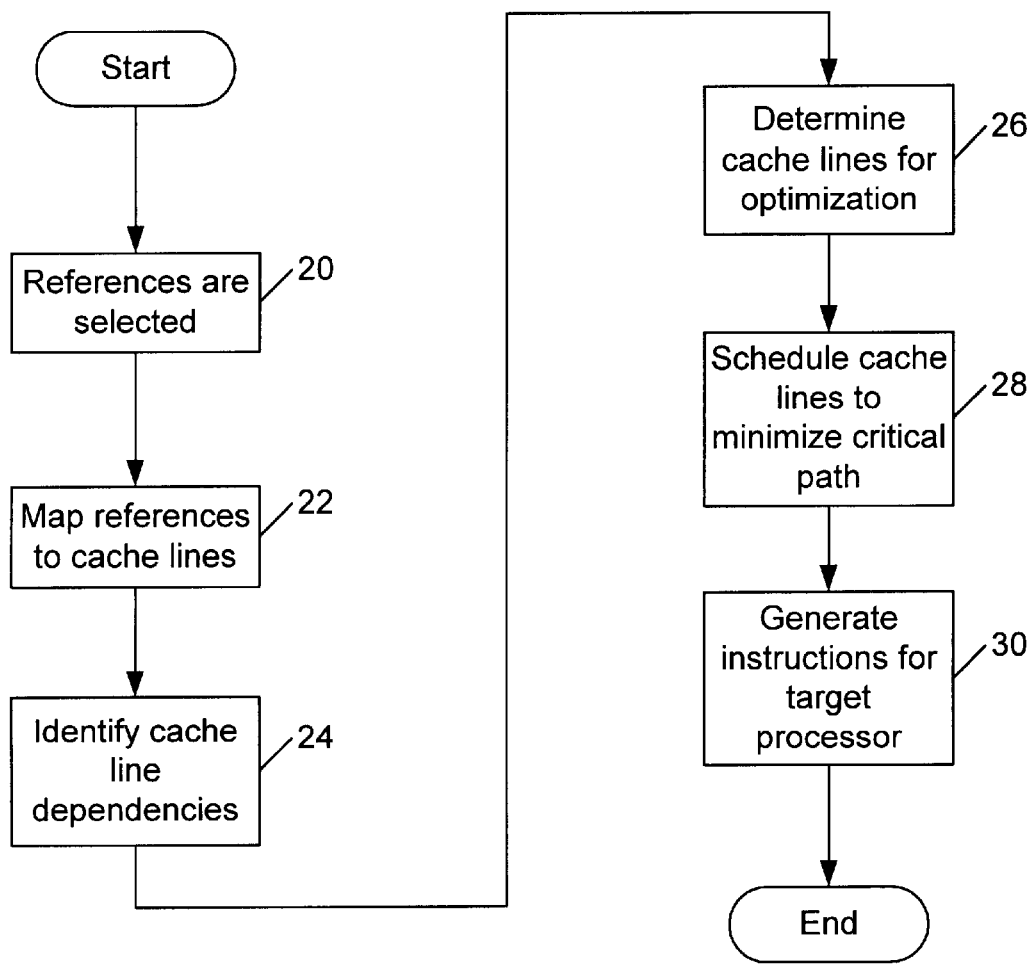
FIG. 3 is a flow chart describing a process in accordance with an embodiment of the present invention.

FIG. 3 is a flow chart describing a cache line scheduling process in accordance an embodiment of the present invention. In general, the process begins with the automatic selection of references (step 20). The selected references are then mapped to cache lines (step 22). Next, cache line dependencies and probabilities of usefulness are identified within the control flow of the program (step 24). Cache lines are selected for optimization within a given function based on the determined dependencies (step 26). The cache lines are then scheduled within the control flow to minimize the critical path, i.e., the longest chain of cache line dependencies (step 28). Finally, the cache line scheduler (33) passes the optimized control flow with cache lines and associated probabilities to the instruction scheduler (35) where instructions are generated for the target processor (step 30).

Figure 4:
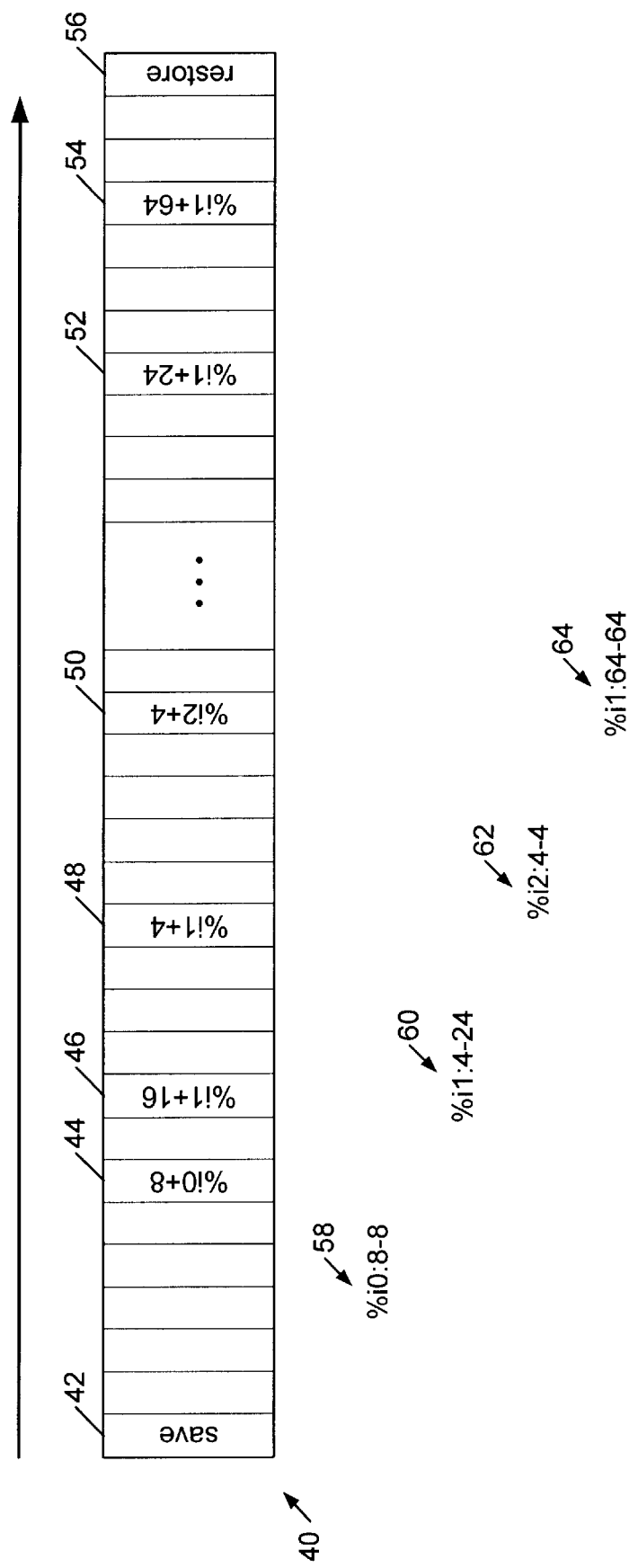
FIG. 4 shows an exemplary instruction line with identified cache lines in accordance with an embodiment of the present invention.
Figure 5:
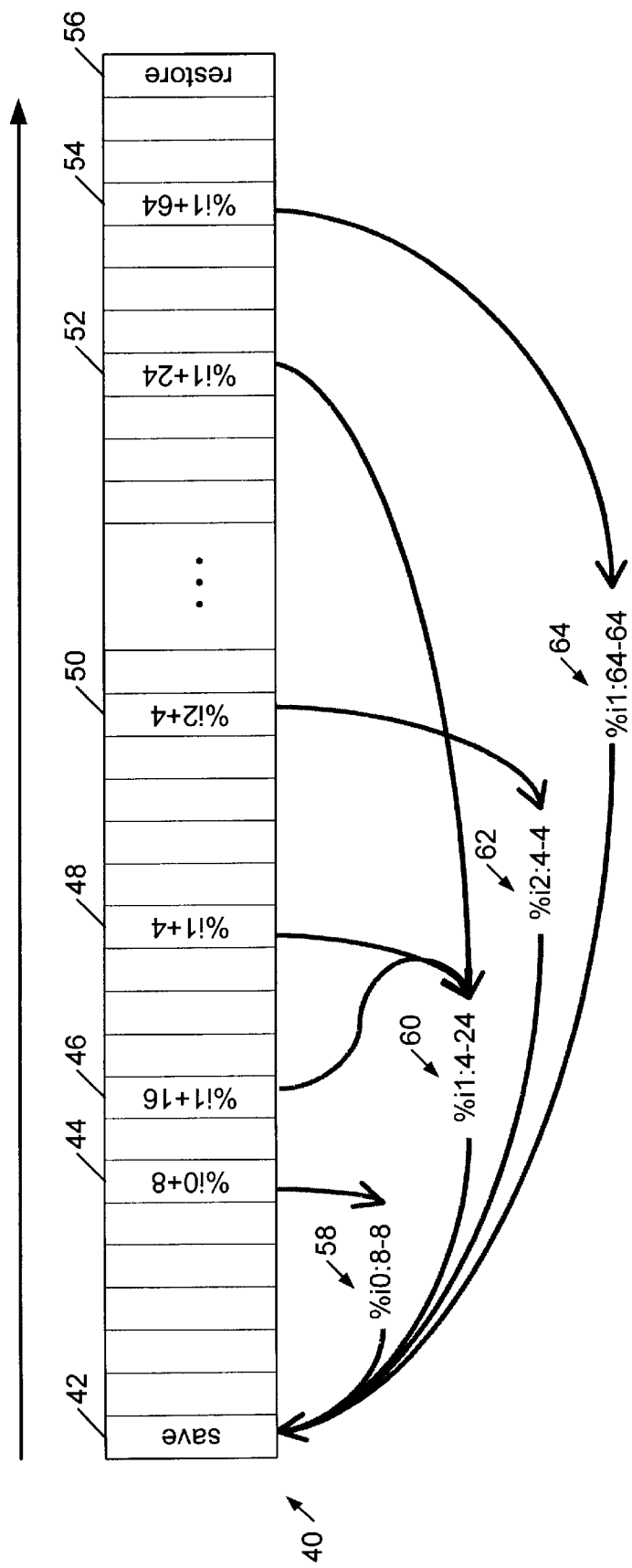
FIG. 5 shows an exemplary instruction line with identified dependencies in accordance with an embodiment of the present invention.
Figure 6:
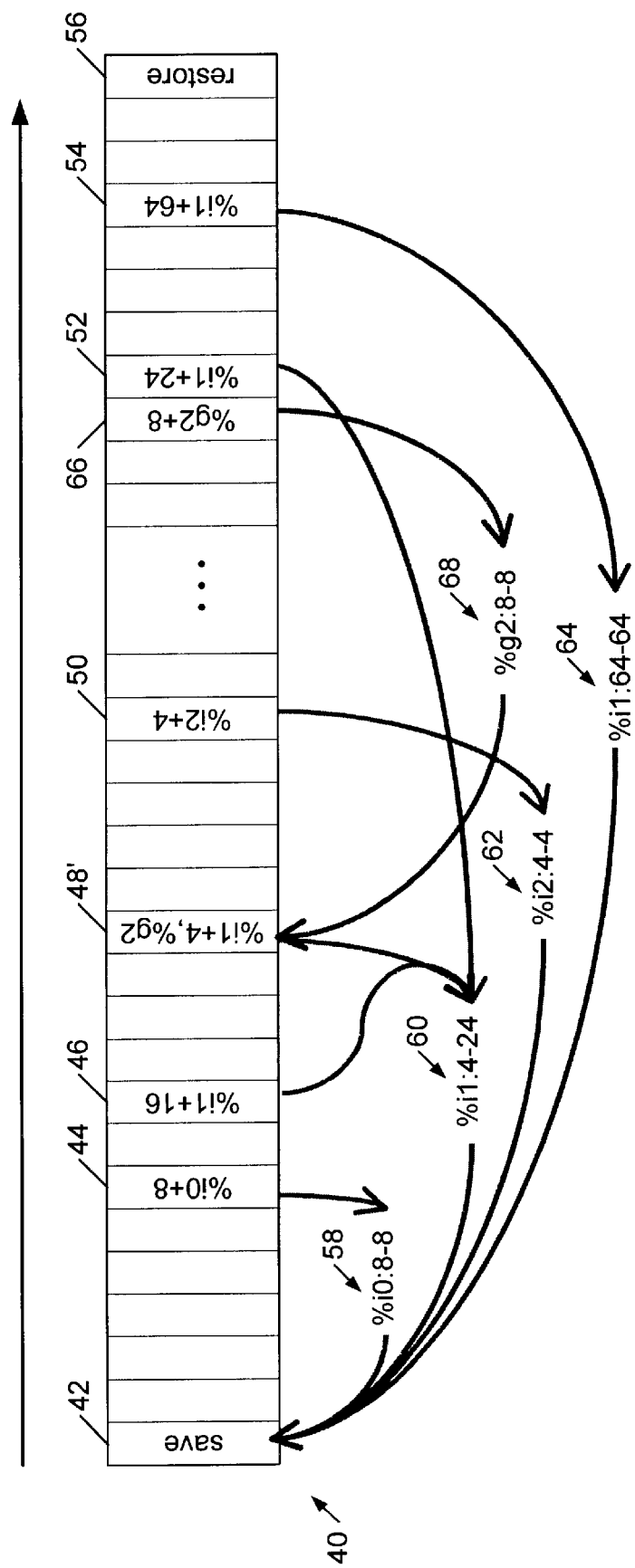
FIG. 6 shows an exemplary cache line scheduling diagram in accordance with an embodiment of the present invention.

More specifically, in one embodiment, automatic selection of references (step 20) may be performed by locating an address forming operations and memory operations (or other prefetchable operations) within the source code (34). The location of these operations defines schedulable portions of the source code (34). Referring to FIGS. 4 and 5, an exemplary schedulable portion (40) of source code (34) is shown. The flow proceeds in the direction designated by the arrow and begins with a save instruction (42) and ends with a restore instruction (56). In the situation shown, the save instruction (40) generates addresses i0, i1, and i2.

The schedulable portions of the source code (34) can be optimized by the cache line scheduler (33) and then passed, one portion at a time, to the instruction scheduler (35). In this manner, the instruction scheduler is "spoon-fed" manageable portions of the source code (34) and instruction scheduler processing is, in turn, optimized. Also, because the portions being sent to the instruction scheduler (35) have been optimized by the cache line scheduler (33), instruction scheduler processing is optimized in that the occurrence of duplicate fetches in the portion are reduced. Further, the references are provided to the instruction scheduler (35) in the most efficient order, i.e., the portion of the source code (34) sent to the instruction scheduler (35) has been optimized for the longest path of dependencies or "critical path" of the flow in that portion. These concepts will be discussed in more detail later.

Once a schedulable portion of the source code (34) has been located by the cache line scheduler (33), references existing between the address forming operation and the memory operation are automatically selected. Referring to FIGS. 4 and 5, between the save (42) and restore (56) instructions are a series of references that refer to the generated addresses i0, i1, and i2. The references consist of a base address register (for example, i0, i1, or i2) and an offset to that base address register value (for example, a real number). In the situation shown, several representative references are listed among the flow, i.e., %i0+8, %i1+16, %i1+4, %i2+4, %i1+24, and %i1+64 denoted by numerals (44), (46), (48), (50), (52), (54) respectively. In later Figures, references will be simply denoted by base address register and offset.

Those skilled in the art will appreciate that the selection of references for optimization can be done through various means. For instance, by using heuristic selection all references can be selected through pointers and all references can be selected to global data. Alternatively, feedback selection can be used. Feedback selection involves gathering cache miss statistics on loads and providing the collected information back to the compiler.

After selecting references, cache lines to which the references can be mapped must be identified. References share a base address or base register through structure pointers and have different offsets based on the fields referenced. Each set of selected references that share a given base register forms the basis for a cache line. The offsets of each reference sharing the base register determine the size of the cache line. When identifying cache lines, the cache line scheduler (33) considers the hardware size and may build several cache lines with the same base register, if references exist that have largely different offsets from that base register. Referring to FIGS. 4 and 5, identified cache lines %i0:8-8, %i1:4-24, %i2:4-4, %i1:64-64 are shown denoted by numerals (58), (60), (62), (64) respectively. In later Figures, the cache lines will simply be denoted by base address register and cache line size. As can be seen, reference %i0+8 (44) is mapped to cache line %i0:8-8 (58); references %i1+16 (46), %i1+4 (48), and %i1+24 (52) are mapped to cache line %i1:4-24 (60); reference %i2+4 (50) is mapped to cache line %i2:4-4;

and reference %i1+64 (54) is mapped to cache line %i1:64-64 (64). In the situation shown, the cache line scheduler (33) created two cache lines for the base address register i1 due to the wide variation between the offsets of references using that base address. For example, considering a cache line of size 64-bytes, a reference with an offset of 4 cannot be guaranteed to be mapped to the same cache line as a reference with an offset of 64 as the alignment of the base address register is not known. References with offsets of 16 or 24, on the other hand, could be probabilistically assumed to be mapped to the same cache line as the reference with an offset of 4.

While mapping references to cache lines, the cache line scheduler (33) must also keep track of "prefetch regions." The prefetch regions affect which references are selected and how the cache lines are generated. Once the cache lines are generated, dependencies between cache lines, addresses, and references are identified. References depend on cache lines and, in turn, cache lines depend on address generation. That is, the load of an address is dependent on the cache line associated with that address, while each cache line depends on the instruction that generate the base register defining that cache line.

Referring to FIG. 5, when identifying dependencies, each reference is traced back to the beginning instruction. In the situation shown, there are only direct references. That is, each reference can be traced back to the save instruction (42) through one cache line. As can be seen reference %i0+8 (44) can be traced through cache line %i0:8-8 (58); references %i1+16 (46), %i1+4 (48), and %i1+24 (52) can be traced through cache line %i1:4-24 (60); reference %i2+4 (50) can be traced through cache line %i2:4-4; and reference %i1+64 (54) can be traced through cache line %i1:64-64 (64). Thus, in the example shown, the cache lines are all equivalent to the critical path.

Referring to. FIGS. 6–9, if the reference %i1+4 (48) were modified to %i1+4,%g2 denoted (48'), the reference would assign base address register g2. Thus, references using base address register g2, for example, reference %g2+8 denoted (66), will be dependent on the reference %i1+4,%g2 (48'). As can be seen, reference %g2+8 (66) maps to cache line %g2:8-8 (68). The cache line %g2:8-8 (68) must be traced back to the reference on which it depends, %i1+4,%g2 (48'), which then, in turn, can be traced back to the save instruction (42).

Figure 7:
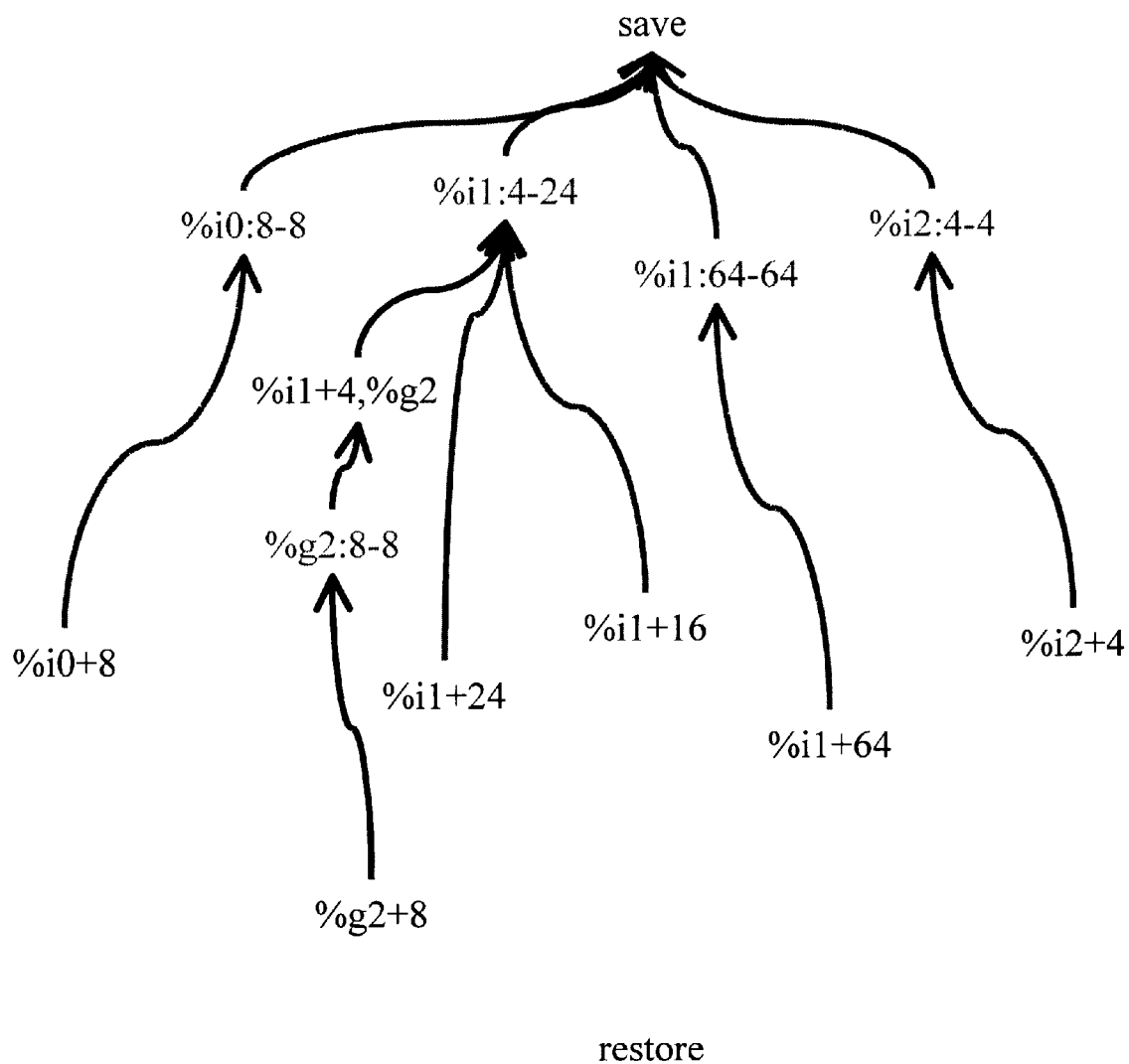
FIG. 7 shows an exemplary instruction line with identified dependencies in accordance with an embodiment of the present invention.

As can be seen in the tree diagram shown in FIG. 7, the path containing the dependency, i.e., the path from %g2+8 to %g2:8-8 to %i1+4,%g2 to the save instruction (For clarity, the references and cache lines are not shown denoted by numerals), is the longest path in the control flow. Thus, it is the path with the dependency that is the critical path and should be scheduled first by cache line scheduler (33). After scheduling for that path, schedule can be filled in with independent cache lines.

Figure 8:
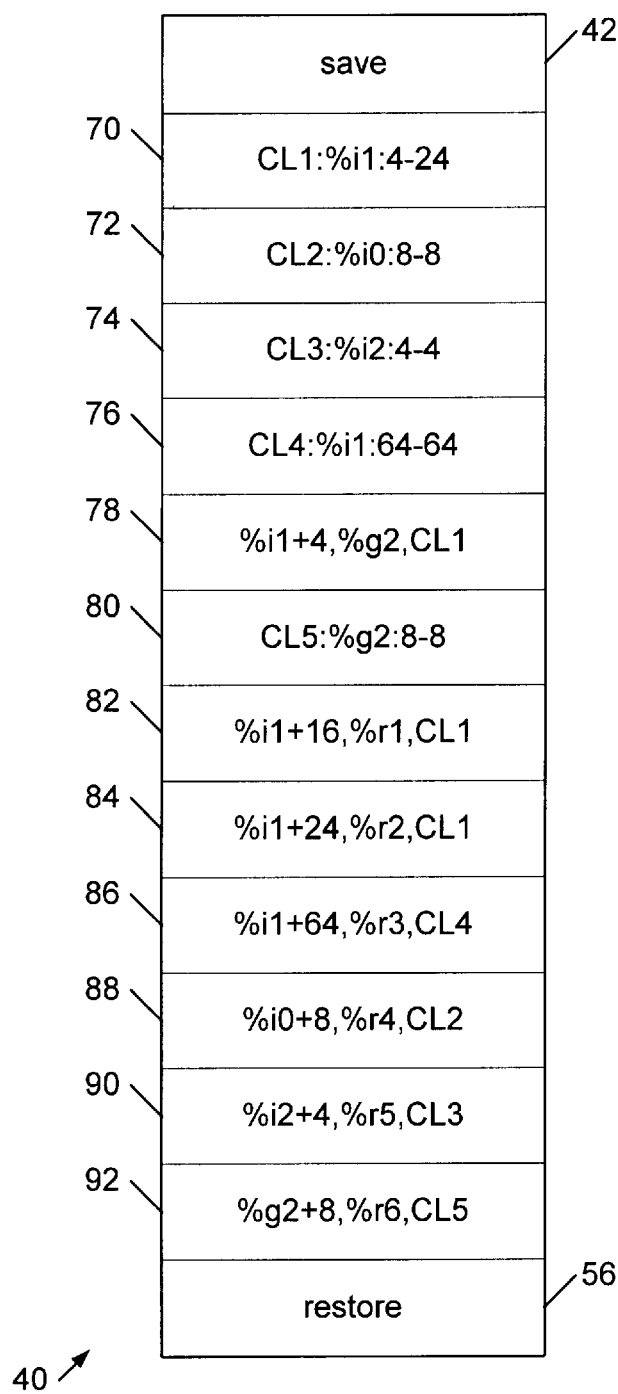
FIG. 8 shows an exemplary cache line schedule in accordance with an embodiment of the present invention.

FIG. 8 shows an exemplary cache line schedule with the critical path being scheduled first. Identified cache lines are inserted into the schedulable portion (40), i.e., the cache lines become pseudo-instructions with dependencies on other instructions. Cache line scheduler (33) schedules the cache lines within the control flow to optimize for the critical path. As can be seen, cache line pseudo-instructions (70), (72), (74), and (76) are scheduled before the reference (78) that affects another cache line. Further, the cache line (70) on which reference (78) depends is scheduled first. Once the reference (78) on which the cache line (80) depends is scheduled, cache line (80) is scheduled next. The dependent reference (92) itself is scheduled last. The remaining references (82), (84), (86), (88), and (90) are filled into the optimized schedulable portion (40'). Note that all references are scheduled with a notation of the cache line on which the reference depends, i.e., CL1, CL2, CL3, CL4, or CL5, and destination registers have been specified for all references, i.e., %r1, %r2, %r3, %r4, %r5, %r6.

Those skilled in the art will appreciate that the dependencies can use slightly modified dependency algorithms already in the compiler to track where to place these cache line pseudo-instructions. Further, it is important to note that the base registers are of infinite quantity and can later be mapped to virtual or physical registers, as register pressure allows. Finally, the cache line scheduler (33) passes the optimized schedulable portion (40') of the control flow in source code (34) to the instruction scheduler (35).

Figure 9:
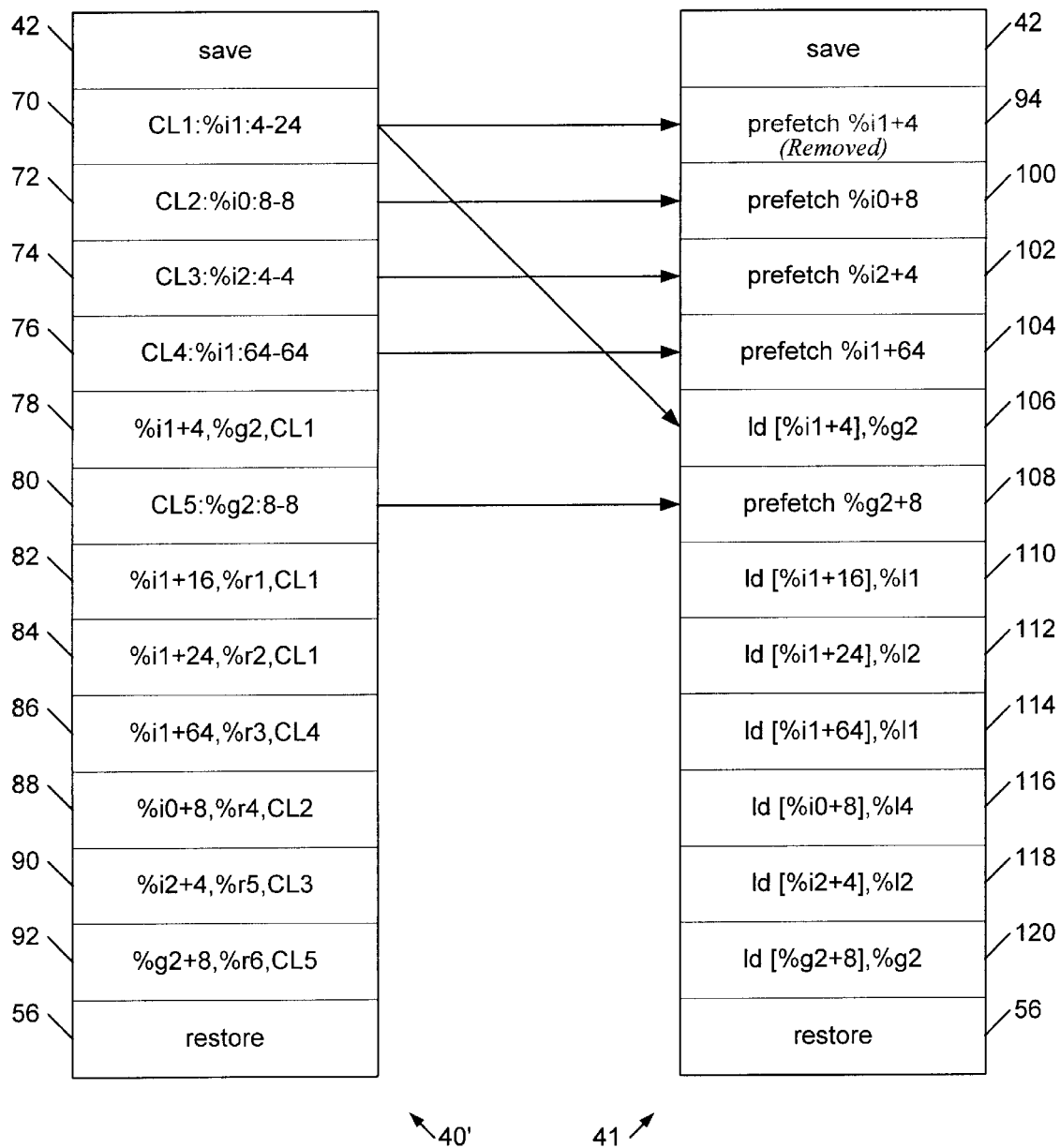
FIG. 9 shows an exemplary instruction set generated from the cache line schedule in accordance with an embodiment of the present invention.
Figure 10:
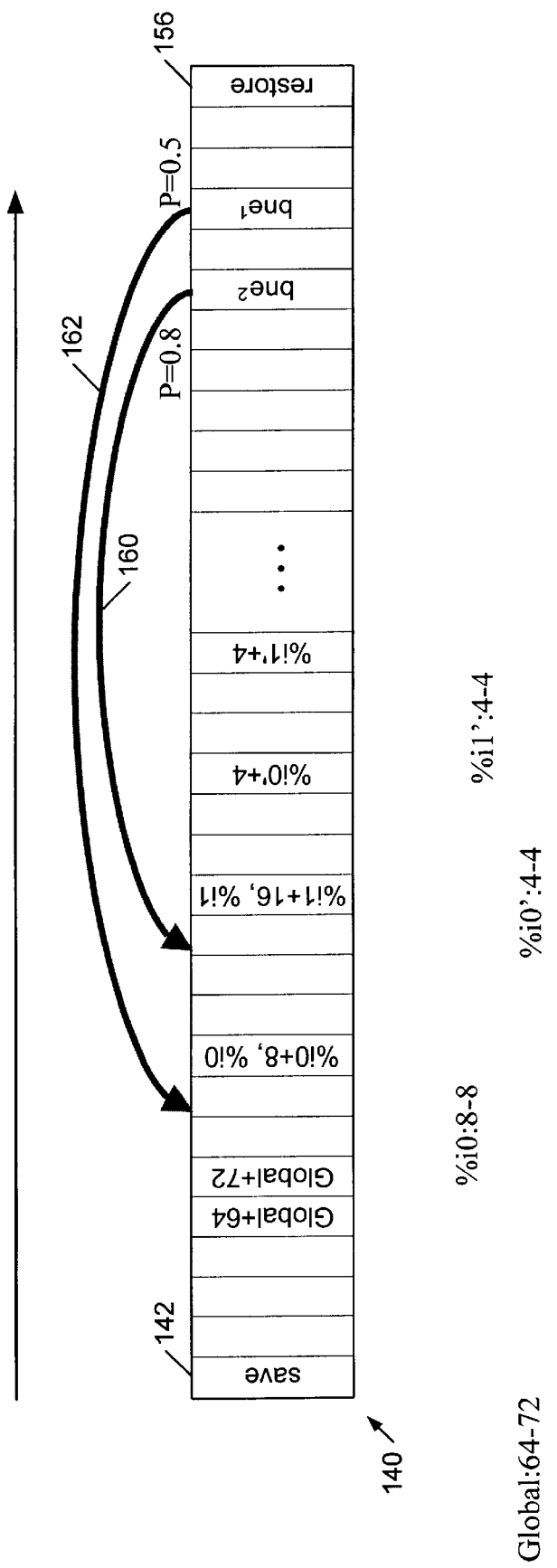
FIG. 10 shows an exemplary instruction line with identified cache lines in accordance with an embodiment of the present invention.

Referring to FIG. 9, instruction scheduler (35) generates instructions for the optimized schedulable portion (40'). The instruction scheduler (35) generates prefetches (94), (100), (102), (104), (108) for the cache line pseudo-instructions (70), (72), (74), (76), and (80) respectively. Note that prefetch (94) is scheduled for cache line pseudo-instruction (70) because multiple references mapped to that cache line. To minimize memory latency, a blocking load can be used after all independent prefetches are issued. Also, the nature of the load instruction allows a prefetch to be incorporated into the first instruction. Thus, prefetch (94) is removed and incorporated into instruction (106). The instruction scheduler (35) then generates instructions (110), (112), (114), (116), (118), and (120) for the remaining references (82), (84), (86), (88), (90), and (92). Note that the instructions shown (106), (110), (112), (114), (116), (118), and (120) are exemplary of the load operation for a SPARC™ system.

Referring to FIGS. 10–13, an example is shown in which loops are included among the references. In the situation shown, the portion (140) being optimized begins with save instruction (142) and ends with restore instruction (156). Between the save (142) and restore (156) instructions are a series of references that refer to the generated addresses i0 and i1, namely, %i1+8,%i0, %i1+16,%i1, %i0'+4, and %i1'+4. Note that i0' and i1' are used to denote dependent references to the respective base address. Also, two global references exist, Global+64 and Global+72, and two branch not equal instructions bne$^1$ and bne$^2$ exist. Global:64-72, %i0:8-8, %i1:16-16, %i0':4-4, and %i1':4-4 can be identified as cache lines within the portion (140). Further, as can be seen, two loops are created by branch not equal (bne) instructions, an exterior loop (160) created by bne$^1$ and an interior loop (162) created by bne$^2$. The probability of the bne instructions occurring is 50% (P=0.5) and 80% (P=0.8) for bne$^1$ and bne$^2$ respectively. Probability usage will be discussed in detail later.

Figure 11:
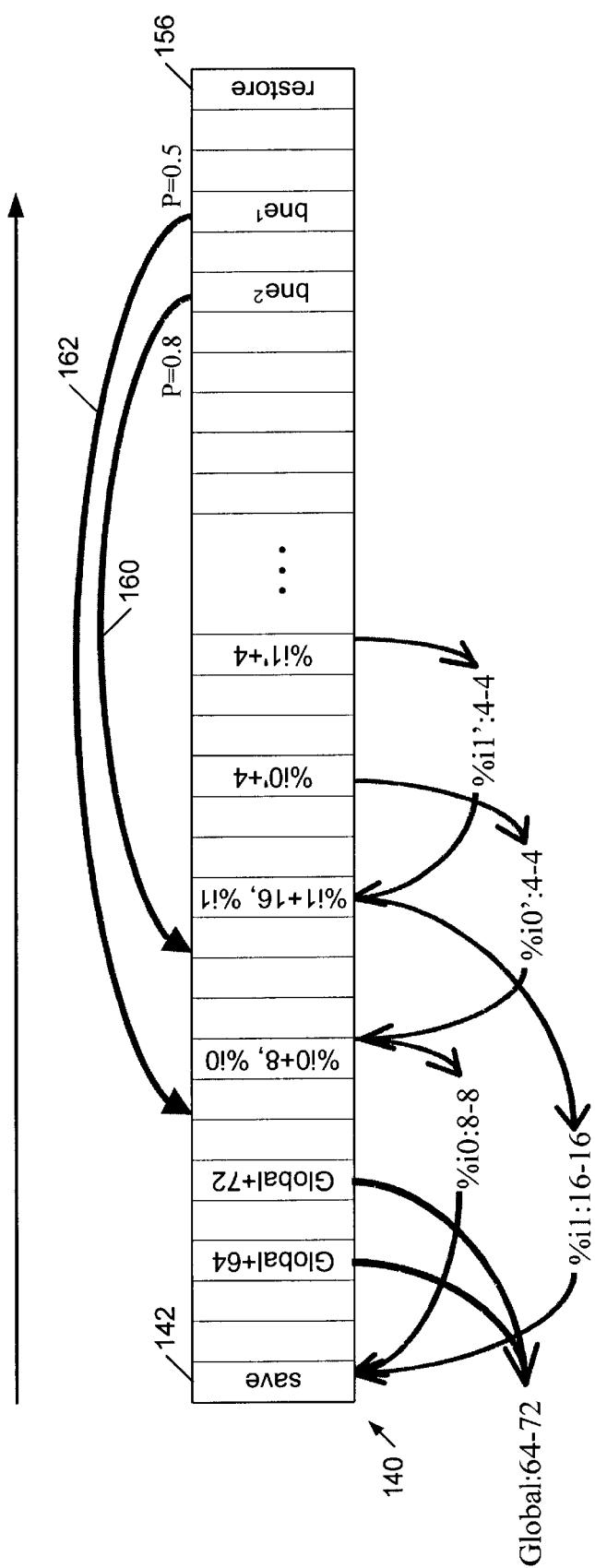
FIG. 11 shows an exemplary instruction line with identified dependencies in accordance with an embodiment of the present invention.
Figure 12:
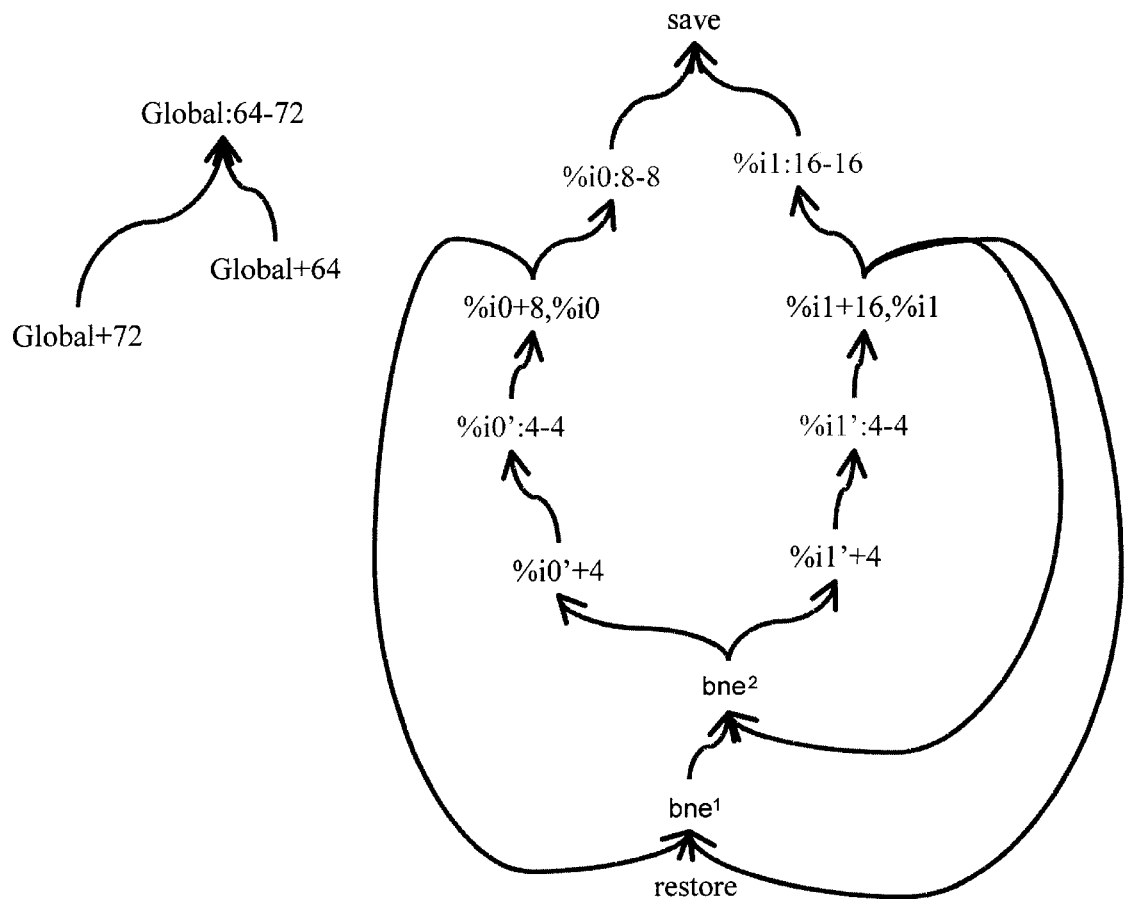
FIG. 12 shows an exemplary cache line scheduling diagram in accordance with an embodiment of the present invention.

As shown in FIG. 11, by identifying the dependencies as described above, it can be seen that there are two dependent references within the interior loop (162), namely %i1'+4 and %i0'+4. One of the dependent references, %i1'+4, is entirely within the interior loop (162) depending from %i1+16, %i1. The other dependent reference, %i0'+4, is dependent on a reference, %i0+8, %i0, existing outside the interior loop (162) but within the exterior loop (160). FIG. 12 shows a tree diagram of the paths in the portion (142). Because both dependent references are on the path of bne$^2$, while potentially only one of the dependent references is on the path of bne$^1$, those skilled in the art will appreciate that the critical path is the path of bne$^2$. Also, note that the two global references are completely independent.

Figure 13:
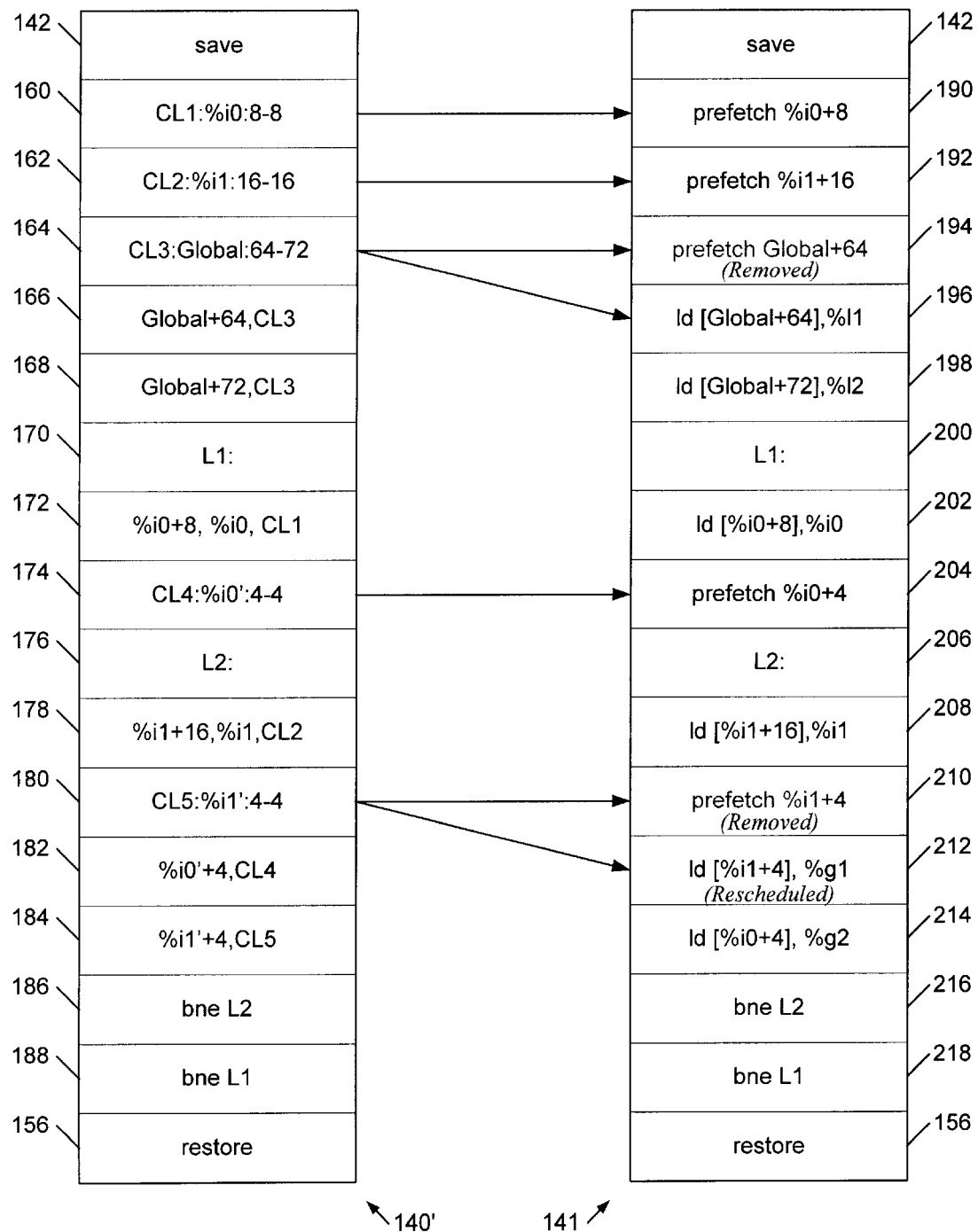
FIG. 13 shows an exemplary instruction set generated from the cache line schedule in accordance with an embodiment of the present invention.

Referring to FIG. 13, the cache line scheduler (33) inserts cache line pseudo-instructions (160), (162), (164). The scheduling takes place as shown in the Figure. Next, the global references Global+64 and Global+72 are scheduled because these references are outside the exterior loop (160). The point (170) to which the exterior loop (160) returns is also contained within the flow. Then, the first reference %i0+8,%i0 (172) is scheduled, followed by the scheduling of the dependent cache line pseudo-instruction (174) for the dependent reference %i0'+4. The point (176) to which the interior loop (162) is contained within the flow next. After entering the interior loop (162), the non-dependent reference %i1+16,%i1 is scheduled (178), followed by the cache line pseudo-instruction (180) for the remaining dependent reference %i1'+4. The two dependent references %i0'+4 and %i1'+4 are scheduled last (182) and (184) respectively. The flow ends with the two bne instructions (186) and (188), and the restore instruction (156).

When the optimized portion (140') is passed to the instruction scheduler (35), as before, the cache line pseudo-instructions (160), (162), and (164) are scheduled as prefetches (190), (192), and (194), and a prefetch is allowed to be removed and incorporated into the first instruction. Accordingly, the global prefetch (194) is removed and incorporated into load instruction (196). Load instructions (196) and (198) are generated from global references (166) and (168) respectively. That is followed by the point (200) to which the exterior loop (160) returns generated from point (170). The instructions are generated for remainder of the references and cache line pseudo-instructions in accordance with the previous description. The load instruction (202) is generated from reference (172), the prefetch (204) is generated from cache line pseudo-instruction (174), and the point (206) to which the interior loop (162) returns is then reached. Within the interior loop (162), the independent reference (178) is generates the load instruction (208) and cache line pseudo-instruction (180) generates prefetch (210). Note, however, that because a load instruction (212) is generated for the dependent reference (182) next, the prefetch (210) is removed and incorporated into that load instruction (212). Finally, the load instruction (214) is generated for cache line pseudo-instruction (184) and the instruction set (141) ends with the two bne instructions (216) and (218), and restore instruction (156). Note that the load instruction (212) is rescheduled. At the scheduling decision between load instructions (212) and (214), load instruction (212) is chosen because more cache misses are permitted to proceed in parallel, i.e., the choice permits two outstanding cache line fetches, load instruction (212) and prefetch (204). Further, load operation (214) is not chosen, and thus is rescheduled, because that operation would serialize the fetches.

Loops that have pointers with invariant addresses will not have associated cache line misses in the loop. In such a case, cache misses only occur before the loop. Conversely, loops having pointers with varying addresses will have cache line misses within the loop, and associated cache line pseudo-instructions. As an example of cache line dependencies, during multiple pointer de-references, multiple cache line dependencies are generated. Each cache line is dependent on the previous and thus, the most dependent cache line dictates the critical path.

Figure 14:
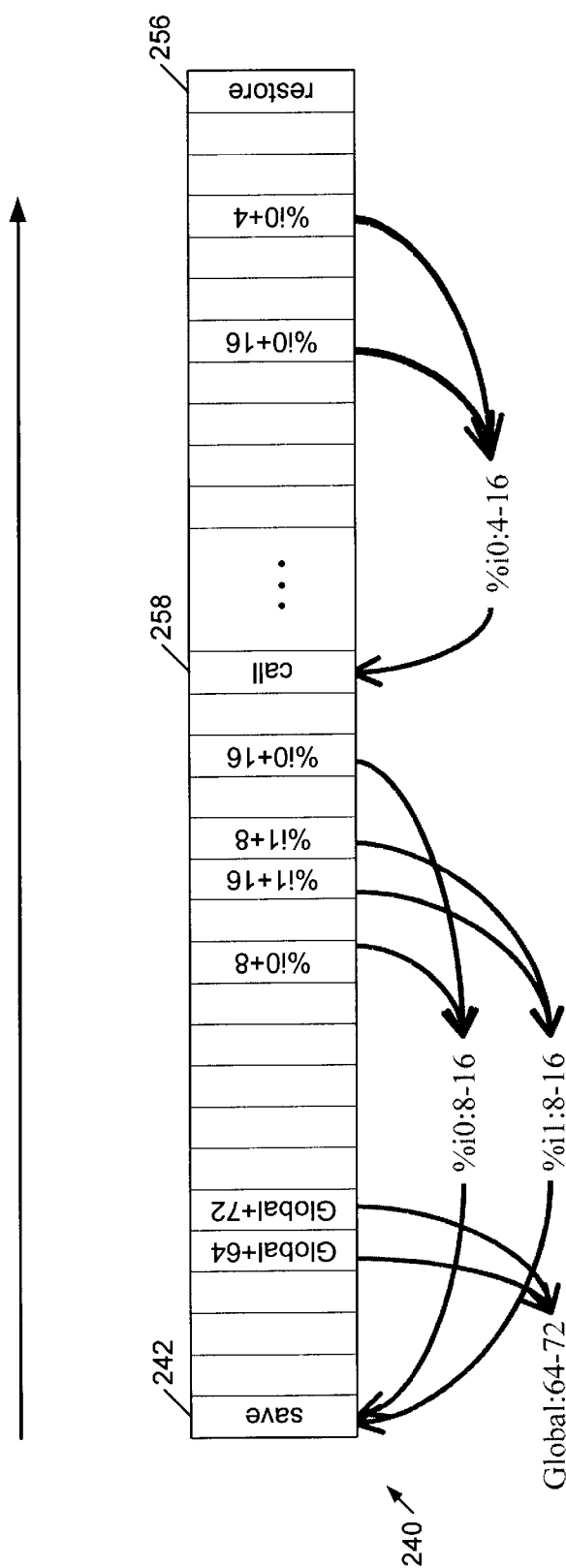
FIG. 14 shows an exemplary instruction line with identified dependencies in accordance with an embodiment of the present invention.
Figure 15:
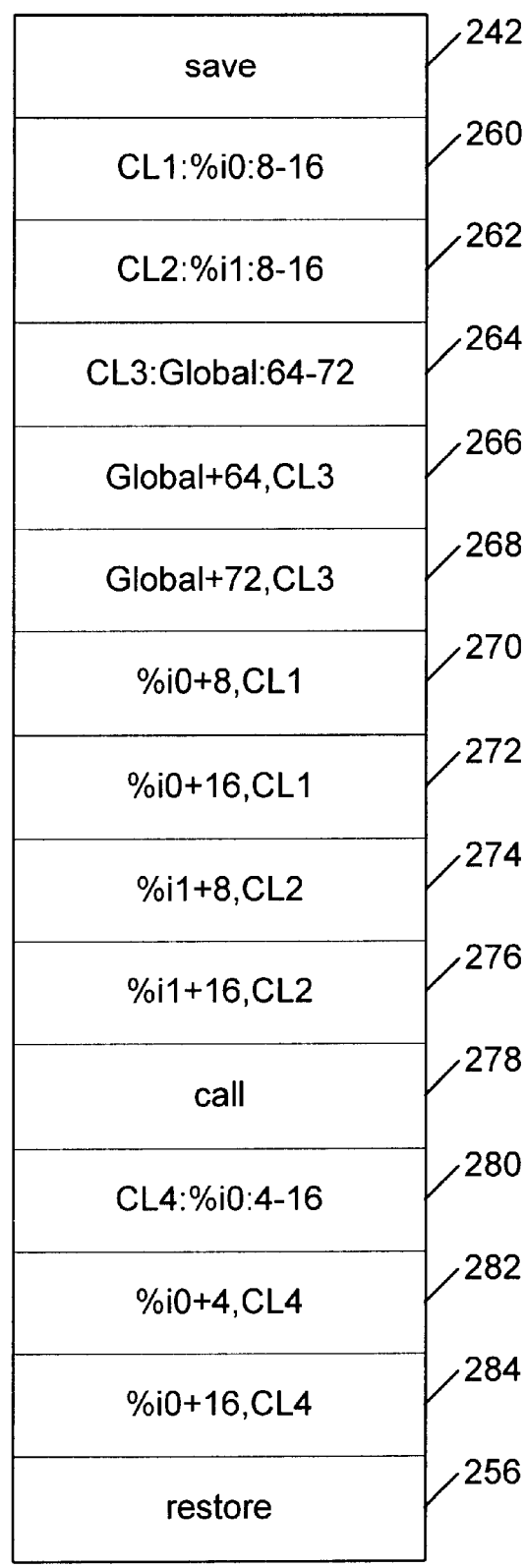
FIG. 15 shows an exemplary cache line schedule in accordance with an embodiment of the present invention.

Call sites (instructions that call other functions) may modify cache line generation. Referring to FIGS. 14 and 15, if call sites appear within the control flow, these call sites may or may not be optimized across by the cache line scheduler (33) based on prefetch region options. If optimization occurs across call sites, the call sites have no effect on the optimization process. Note, however, that in doing so, the call optimized across must not only be of duration long enough to cover the prefetch time, but also, short enough not to invalidate the cache line being used. On the other hand, if optimization does not occur across call sites, the instruction list is merely split at the call site. In this case, it is assumed that the call sites invalidate or "kill" all cache lines in the control flow. That is, because call sites are a barrier to cache line use, separate regions for the creation of cache lines are produced.

Flow (240) begins with save instruction (242) and ends with restore instruction (256). After the save instruction (242), two global references, Global+64 and Global+72, and several references, %i0+8, %i1+16, %i1+8, %i0+16, exist. The global references can be mapped to the cache line Global:64-72. References %i0+8 and %i0+16 can be mapped to the cache line %i0:8-16 and %i1+8 and %i1+16 can be mapped to the cache line %i1:8-16. Also within flow (240), a call site (258) exists before the last two references %i0+16 (284) and %i0+4 (282). Because the call site is a boundary to cache line usage, references %i0+16 and %i0+4 must be mapped to a new cache line %i0:4-16 (280). That is, the cache line %i0:8-16 (260) occurring before the call site is killed by the call site and thus cannot be used by %i0+16 (284). Also, while the offsets of reference %i0+4 is relatively close to %i0+8, it would be of no use to define the cache line %i0:4-16 before the call site in view of the invalidating nature of the call site.

Therefore, referring to FIG. 15, cache line scheduler (33) generates optimized flow (240') by inserting cache line pseudo-instructions (260), (262), and (264) into the flow (240) before the call site, and cache line pseudo-instruction (280) into the flow (240) after the call site (278). Note that because the references shown were all independent references, the references (266), (268), (270), (272), (274), (276), (282), an (284) can be filled into the optimized flow (240').

In order to better schedule instructions to fetch cache misses, accurate probabilities for cache misses are necessary. Cache lines have probabilities that associated references will reference the cache line. These probabilities are updated as cache lines are scheduled. To reduce computation time of cache line generation, any edge paths with probabilities of zero can be pruned. Further, call sites can also be used to prune the computation time, as there is no need to proceed beyond a call site if such optimization is not requested.

From training runs, the compiler can determine the probability that any reference can be reached from any basic block. Cache miss probabilities are dependent on these reference probabilities, i.e., the probability that a cache line will not be used is the same as the probability that the reference associated with the cache miss will not be used from that basic block. So, first when a cache line is not going to be used is determined and, then, the inverse of that probability is taken.

Figure 16:
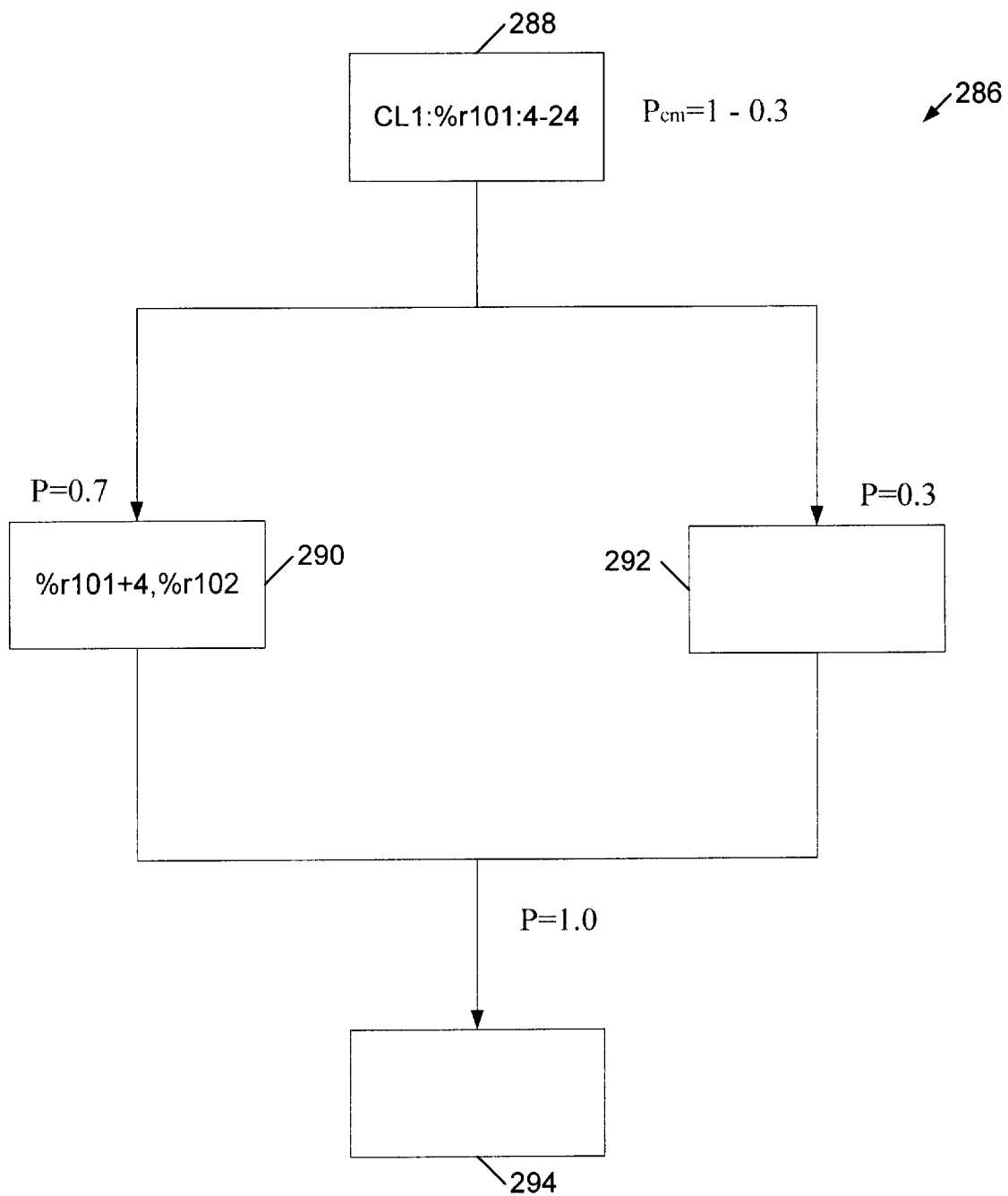
FIG. 16 shows an exemplary branched instruction line with identified cache line probabilities in accordance with an embodiment of the present invention.

FIG. 16 shows an exemplary block diagram (286) begin with a basic block 288, which branches into basic blocks (290) and (292) from, for instance, a branch instruction, and then ends in basic block (294). The basic block has a cache line %r101:4-24 associated with a base address register %r101. The branch instruction has a 70% probability (P=0.7) of reaching basic block (290) containing a reference %r101+4,%r102 that uses the cache line %r101:4-24. Alternatively, the branch instruction has a 30% probability (P=0.3) of reaching basic block (292), which has no reference associated with the cache line. Because basic blocks (290) and (292) branch to back to common basic block (294). Thus, the probability of not using the cache line %r101:4-24 is equal to the probability of reaching basic block (292) or 30%. Then, to find the probability that the cache line %r101:4-24 will be used by the reference %r101+4,%r102, the probability of not using the reference is subtracted from one. That is, the inverse of the probability that the cache line will not be used is equal to the probability that the reference %r101+4,%r102 will use the cache line %r101:4-24, ie., 1.0−0.3=0.7 or 70%. Alternatively, it is possible to compute these probabilities by just adding the probabilities of the blocks using the cache line, e.g., (318) and (314).

Figure 17:
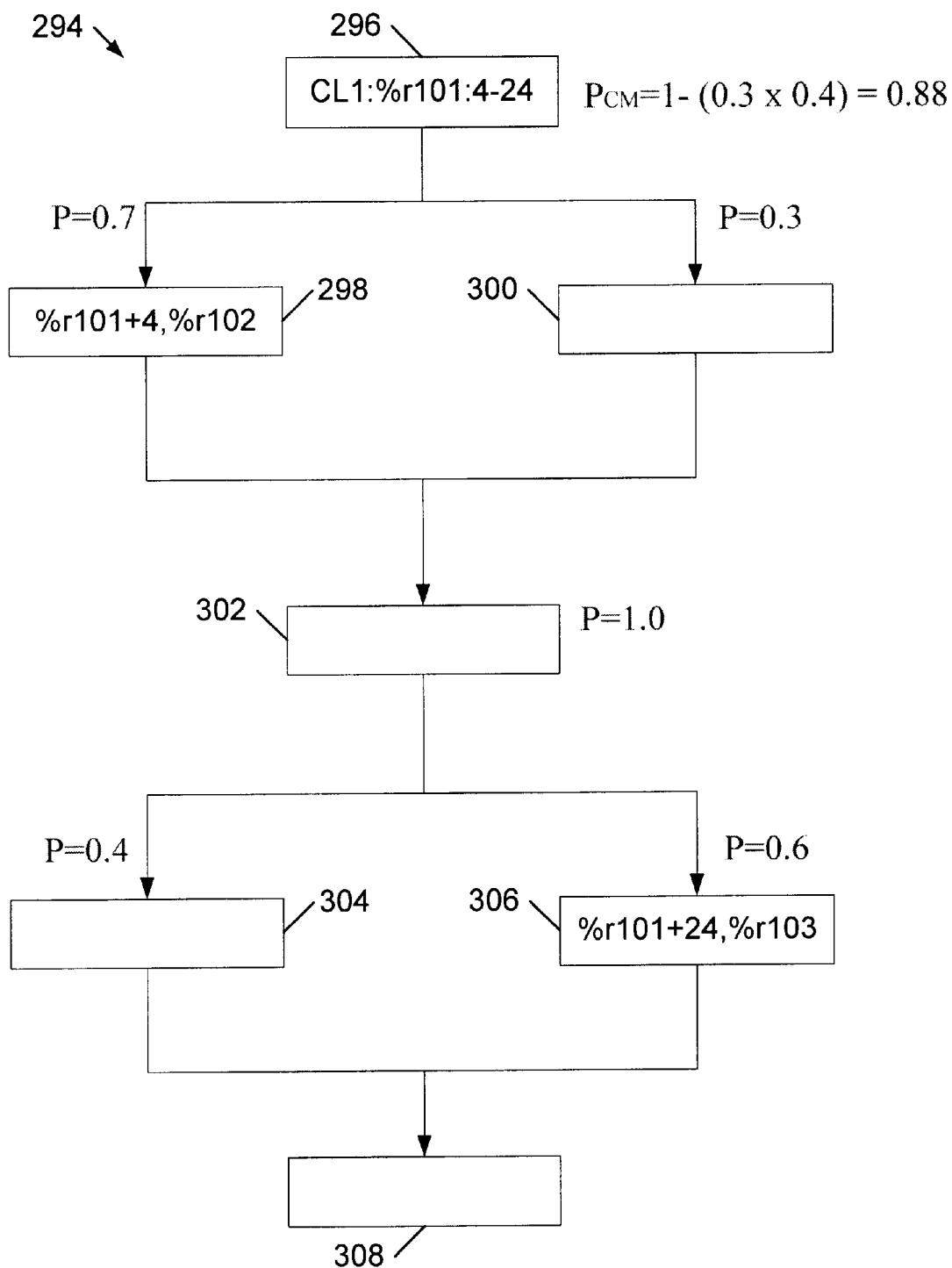
FIG. 17 shows an exemplary branched instruction line with identified cache line probabilities in accordance with an embodiment of the present invention.

FIG. 17 shows a block diagram (294) illustrating multiple stage probability scenario. For simplicity, it is assumed that the probabilities for reaching references are independent. The block diagram (294) begins with basic block (296) which branches into basic block (298) and basic block (300). Basic blocks (298) and (300) return to a common basic block (302), which branches into basic blocks (304) and (306). Basic blocks (304) and (306), in turn, return to a common basic block (308). Basic block (296) has a cache line %r101:4-24. The probability of reaching basic block (298), which contains a reference %r101+4,%r102 that uses the cache line %r101:4-24, is 70% (P=0.7). Accordingly, the probability the basic block (300) is reached is 30% (P=0.3). Because both blocks return to basic block (302), the probability of reaching that basic block (302) is 100% (P=1.0).

The probability that, from basic block (302), the flow will branch to basic block (306), which contains a reference %r101+24,%r103 that uses the cache line %r101:4-24, is 60% (P=0.6). Accordingly, the probability the basic block (304) is reached is 40% (P=0.4). Finally, the ending basic block (308) will be reached.

By calculating the probability that only blocks that do not contain references that use the cache line %r101:4-24 and subtracting that probability from one, the probability that the cache line %r101:4-24 will be used can be found. In the example shown, the probability that the cache line %r101:4-24 will not be used is equal to the product of the probability of reaching basic block (300) and the probability of reaching basic block (304), i.e., 0.3×0.4=0.12. Thus, the probability that the cache line %r101:4-24 will be used is the inverse, i.e., 1−0.12=0.88 or 88%.

Figure 18:
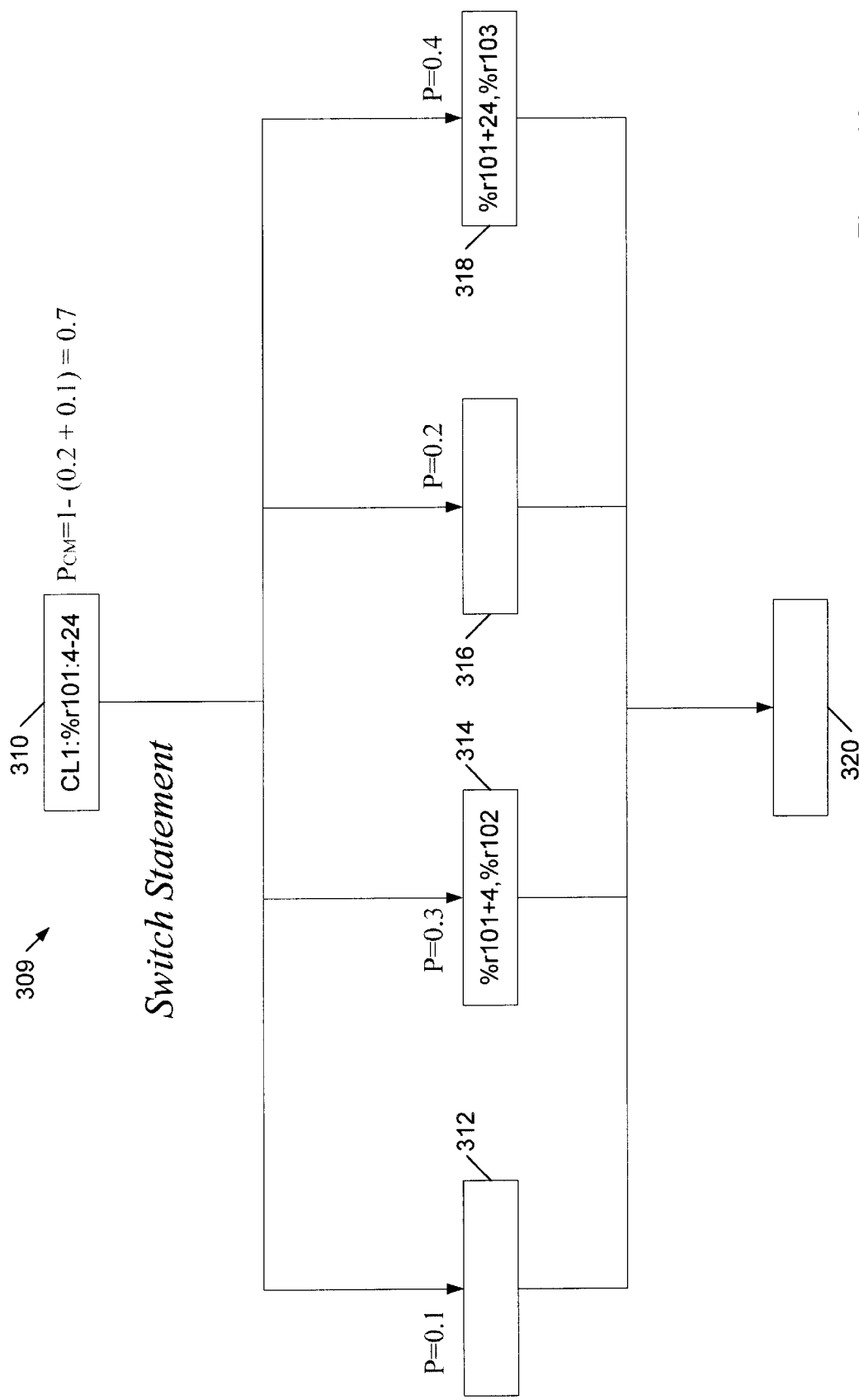
FIG. 18 shows an exemplary branched instruction line with identified cache line probabilities in accordance with an embodiment of the present invention.

When faced with a switch statement, as shown by block diagram (309) in FIG. 18, the probability that the cache line at the top of the switch statement will be used is equal to the inverse of the sum of the probabilities of the basic blocks not containing references to the cache line. For example, basic block (310), which contains a cache line %r101:4-24, passes through a switches to one of basic blocks (312), (314), (316), and (318). The block diagram (309) ends in a common basic block (320). The probability of reaching basic block (312) is 10% (P=0.1), the probability of reaching basic block (314) is 30% (P=0.3), the probability of reaching basic block (316) is 20% (P=0.2), and the probability of reaching basic block (318) is 40% (P=0.4). Basic blocks (314) and (318) contain references %r101+4,%r102 and %r101+24,%r103 that use cache line %r101:4-24 respectively. Thus, the probability of using cache line %r101:4-24 is found by calculating the probability that the cache line %r101:4-24 will not be used, i.e., 0.1+0.2=0.3 or 30%, and subtracting that probability from one, i.e., 1−0.3=0.7 or 70%.

Figure 19:
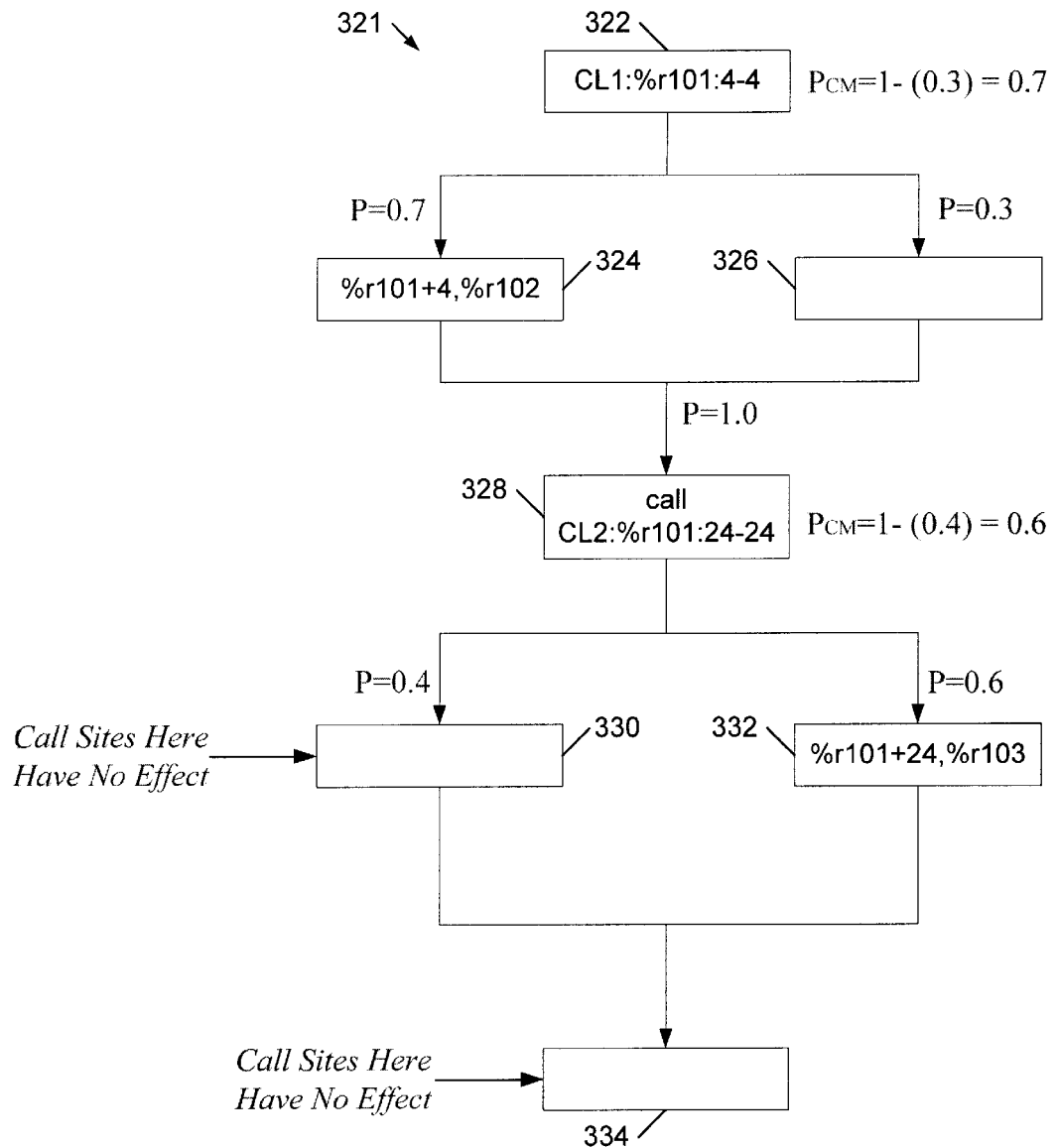
FIG. 19 shows an exemplary branched instruction line with identified cache line probabilities in accordance with an embodiment of the present invention.

Call sites, which may invalidate cache lines, actually simplify cache miss probability computation. Referring to FIG. 19, block diagram (321) is shown. The block diagram begins with basic block (322), which contains a cache line %r101:4-4, and branches into basic blocks (324) and (326). Basic blocks (324) and (326) return to basic block (328), which contains a call site and a cache line %r101:24-24. Basic block (328) then branches into basic blocks (330) and (332), which return to a common basic block (334). Basic blocks (326), (330), and (334) do not contain references to either cache line %r101:4-4 or %r101:24-24 and have probabilities of being reached of 30% (P=0.3) and 40% (P=0.4) respectively. Basic block (324) contains a reference %r101+4,%r102 that uses cache line %r101:4-4 and has a probability of being reached of 70% (P=0.7). Basic block (332) contains a reference %r101+24,%r103 that uses cache line %r101:24-24 and has a probability of being reached of 60% (P=0.6). Assuming call sites kill cache lines, the call site in this example, converts a multiple stage example (similar to that shown in FIG. 17) into two independent stages (similar to that shown in FIG. 16). As described above, ultimately, the probability of using the cache line %r101:4-4 is equal to 1−0.3=0.7 or 70% and the probability of using the cache line %r101:24-24 is equal to 1−0.4=0.6 or 60%.

Figure 20:
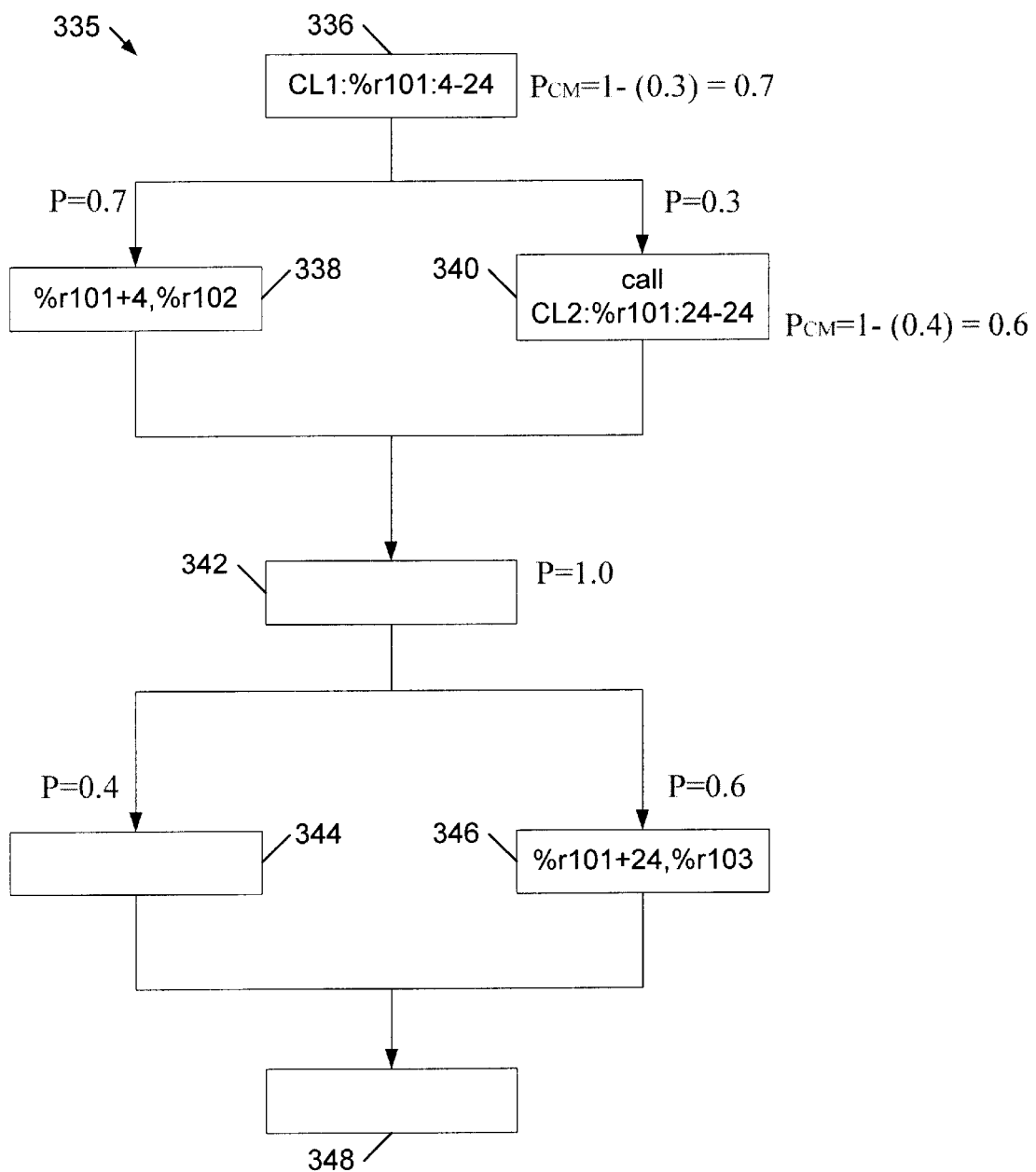
FIG. 20 shows an exemplary branched instruction line with identified cache line probabilities in accordance with an embodiment of the present invention.

Looking at an adaptation of the last example, referring to FIG. 20, block diagram (335) is shown. The block diagram begins with basic block (336), which contains a cache line %r101:4-24, and branches into basic blocks (338) and (340). In this example, basic block (340) contains a call site and a cache line %r101:24-24. Basic blocks (338) and (340) return to basic block (342), which then branches into basic blocks (344) and (346). The block diagram (335) ends in a common basic block (348). Basic blocks (342), (344), and (348) do not contain references to either cache line %r101:4-24 or %r101:24-24 and have probabilities of being reached of 100% (P=1.0) and 100% (P=1.0) respectively. Basic block (338) contains a reference %r101+4,%r102 that uses cache line %r101:4-24 and has a probability of being reached of 70% (P=0.7). Basic block (346) contains a reference %r101+24,%r103 that can use either cache line %r101:4-24 or cache line %r101:24-24 and has a probability of being reached of 60% (P=0.6).

Assuming that call sites kill cache lines, the probability that the cache line %r101:4-24 is the inverse of the probability that the cache line will not be used. Because the call site in basic block (340) will kill cache line %r101:4-24, the probability of reaching basic block (340) is equal to the probability that the cache line %r101:4-24 will not be used, i.e., 30%. Thus, the probability that the cache line %r101:4-24 will be used is 1−0.3=0.7 or 70%. The probability that the cache line %r101:24-24 will be used is also equal to the inverse of the probability that the cache line %r101:24-24 will not be used, i.e., 1−0.4=0.6 or 60%.

Figure 21:
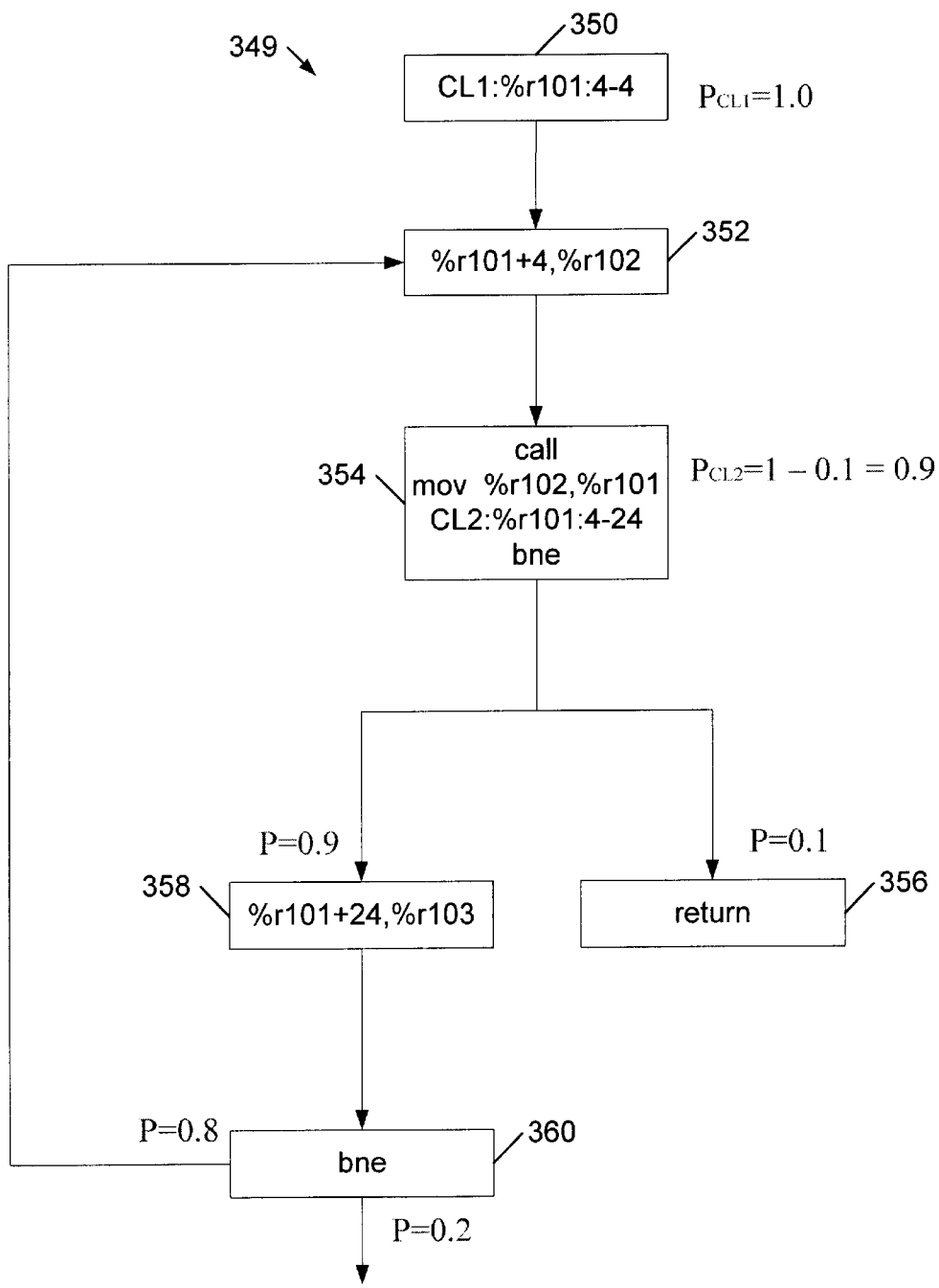
FIG. 21 shows an exemplary branched instruction line with identified cache line probabilities in accordance with an embodiment of the present invention.

Call sites within loops invalidate an active cache line, which forces the generation of a new cache line after the call site. Referring to block diagram (349) shown in FIG. 21, basic block (350) contain a cache line %r101:4-4. Basic block (350) flows into basic block (352), which contains a reference %r101+4,%r102 that uses cache line %r101:4-4. Thus, the probability that cache line %r101:4-4 will be used is 100% (P=1.0). Basic block (352) then flows into basic block (354), which contains a call site, a move instruction, a cache line %r101:4-24 and a bne instruction. Basic block (354) branches into basic blocks (356) and (358). Basic block (356) has a probability of being reached of 10% (P=0.1) and represents a return; meaning that the block (356) does not contain a reference that uses the cache line %r101:4-24. Basic block (358) contains a reference %r101+24,%r103 that uses the cache line %r101:4-24 and has a probability of being reached of 90% (P=0.9). The probability that cache line %r101:4-24 will be used then can be found by taking the inverse of that probability, i.e., 1−0.1= 0.9 or 90%. Basic block (358) flows into basic block (360), which contains a bne instruction. There is an 80% (P=0.8) chance that the bne instruction will direct the flow from basic block (360) to basic block (352) and a 20% (P=0.2) chance that it will not. Thus, if the cache line in block (354) had not been generated as %r101:4-24, but rather as %r101:24-24 there is a possibility that the reference %r101+ 4,%r102 would have missed in cache. Note that these probabilities change when the cache line is moved to a new basic block. Hence, when any scheduler moves a cache line to a new basic block, these probabilities are recomputed.

In view of the above, those skilled in the art will appreciate that instruction scheduling can be made simpler. "Prefetch region" options specify the intensity of prefetch insertion. Alternatively, even load ordering can be used to optimize for cache misses. Prefetch region options are able to specify that only prefetches preserving existing load issue slot cycles are to be used. Also, more aggressive prefetch options can be selected by prefetch regions. These scheduling options can change with prefetch region markers in the control flow. Instruction scheduling uses cache miss dependencies to optimize for the critical path first. When excess processor memory queue bandwidth is available, independent cache lines are scheduled. Instruction scheduling can target various processor architectures based on their memory queue and prefetch instruction limitations.

Address generating instructions can be speculatively duplicated to assist in scheduling the cache line. Further, duplicate instructions can be removed with common subexpression elimination. Also, cache misses are not affected by alias disambiguation. That is, because the address generation instructions associated with the cache lines are speculative, cache lines can be scheduled irrespective of stores. In an exemplary situation, for instance, having a code sequence as shown below in Table 1 and the compiler cannot disambiguate possible aliases %r1+20 and %r2+20.

TABLE 1 store [% r2 + 20]
ld [% r1 + 20], % r3
prefetch [% r3 + 16]
ld [% r3 + 16]

The sequence can be transformed as shown below in Table 2.

TABLE 2 spec ld [% r1 + 20], % r4
prefetch [% r4 + 16]
store [% r2 + 20]
ld [% r1 + 20], % r3
ld [% r3 + 16]

where the first instruction is a speculative (non-faulting) load and the first two instructions are paired. As those skilled in the art will appreciate, it is desirable to extend the distance between the prefetch and the load. The compiler cannot load the correct value into %r3, thus, a speculative load is created. The speculative load is then paired with the prefetch and can be moved further up the instruction stream. The pair is referred to as a speculatively hoisting address and associated prefetch.

Cache line scheduling minimizes the "critical path" height or maximizes the number of outstanding independent cache misses possible within the control flow. At the end of cache miss scheduling, a description specifying the maximal number of cache misses possible is generated with associated probabilities of "usefulness." The instruction scheduler takes into account memory queue bandwidth to throttle cache miss fetches.

Advantages of the present invention may include one or more of the following. The two-phase scheduling provides a more thorough approach to the scheduling of cache lines. The first phase identifies the cache lines, reducing duplicate fetches and minimizing the cache line critical path; this phase maximizes the opportunities for cache line fetching. Cache line scheduling is de-coupled from instruction scheduling. This reduces the scope for instruction scheduling, and helps handle complex control flow. By calculating the probabilities of usefulness for cache lines, cache line scheduling can be optimized. Prefetches may be scheduled based on the machine model and the probabilities of usefulness. Cache misses may be scheduled independently of the machine model. Those skilled in the art will appreciate that the present invention also may include other advantages and features.

While the present invention has been described with respect to a limited number of preferred embodiments, those skilled in the art will appreciate numerous modifications and variations therefrom. The appended claims are intended to cover all such modifications and variations which occur to one of ordinary skill in the art.

What is claimed is:

1. An architecture neutral method of optimizing a cache line comprising:

computing where cache misses are in a control flow; and assigning probabilities to cache misses.

2. The method of claim 1, further comprising:

scheduling cache lines based on the assigned probabilities and where the cache misses are in the control flow.

3. The method of claim 1, further comprising:

calculating cache line probabilities based on the assigned probabilities and where the cache misses are in the control flow.

4. The method of claim 3 further comprising:

pruning the control flow before calculating cache line probabilities.

5. The method of claim 4, further comprising:

using function call sites to prune the control flow.

6. A method of cache line optimization comprising:

duplicating address generation of a cache miss to speculatively hoist address generation and associated prefetch.

7. A method of cache line optimization comprising:

selecting references for optimization;

identifying cache lines;

mapping the selected references to the identified cache lines;

determining dependencies within the cache lines;

calculating probabilities of usefulness of the cache lines; and scheduling the cache lines based on the determined dependencies.

8. The method of claim 7, further comprising:

scheduling prefetches based a predetermined machine model of a fetching engine and calculated the probabilities of usefulness to maximize outstanding memory transactions.

9. The method of claim 8, further comprising: scheduling cache misses independently of predetermined machine model.

10. A method of computing a probability of usefulness for a cache line involving a conditional branch, comprising:
   determining, across the conditional branch, references that use the cache line;
   calculating the probability that the cache line is not used; and
   calculating the probability of usefulness for the cache line based on the probability that the cache line is not used.

11. A software tool for architecture-neutrally optimizing a cache line comprising:
   a program stored on computer-readable media for
      computing where cache misses are in a control flow; and
      assigning probabilities to cache misses.

12. The software tool of claim 11, further comprising:
   a program stored on computer-readable media for
      scheduling cache lines based on the assigned probabilities and where the cache misses are in the control flow.

13. The software tool of claim 11, further comprising:
   a program stored on computer-readable media for
      calculating cache line probabilities based on the assigned probabilities and where the cache misses are in the control flow.

14. The software tool of claim 13 further comprising:
   a program stored on computer-readable media for
      pruning the control flow before calculating cache line probabilities.

15. The software tool of claim 14, further comprising:
   a program stored on computer-readable media for
      using function call sites to prune the control flow.

16. A software tool of cache line optimization comprising:
   a program stored on computer-readable media for
      duplicating address generation of a cache miss to speculatively hoist address generation and an associated prefetch.

17. A software tool of computing a probability of usefulness for a cache line involving a switch statement, comprising:
   a program stored on computer-readable media for
      determining, across the switch statement, references that use the cache line;
      calculating the probability that the cache line is not used;
      calculating the probability of usefulness for the cache line based on the calculated probability that the cache line is not used.

18. A software tool for cache line optimization comprising:
   a program stored on computer-readable media for
      selecting references for optimization;
      identifying cache lines;
      mapping the selected references to the identified cache lines;
      determining dependencies within the cache lines;
      calculating probabilities of usefulness of the cache lines; and
      scheduling the cache lines based on the determined dependencies.

19. The software tool of claim 18, further comprising:
   scheduling instructions based on the scheduled cache lines.

* * * * *